(12) United States Patent
Upadhyay et al.

(10) Patent No.: US 10,309,793 B2
(45) Date of Patent: Jun. 4, 2019

(54) SYSTEMS AND METHODS FOR PARTICULATE FILTER REGENERATION

(71) Applicant: Ford Global Technologies, LLC, Dearborn, MI (US)

(72) Inventors: Devesh Upadhyay, Canton, MI (US); Michael Brendan Hopka, Milford, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 28 days.

(21) Appl. No.: 15/606,791

(22) Filed: May 26, 2017

(65) Prior Publication Data

US 2018/0340784 A1 Nov. 29, 2018

(51) Int. Cl.
| | |
|---|---|
| G01C 21/34 | (2006.01) |
| G01C 21/36 | (2006.01) |
| F01N 9/00 | (2006.01) |
| F01N 3/023 | (2006.01) |
| F02D 41/00 | (2006.01) |

(52) U.S. Cl.
CPC .......... *G01C 21/3469* (2013.01); *F01N 3/023* (2013.01); *F01N 9/002* (2013.01); *F01N 9/007* (2013.01); *F02D 41/00* (2013.01); *G01C 21/3415* (2013.01); *G01C 21/3484* (2013.01); *G01C 21/3492* (2013.01); *G01C 21/3611* (2013.01); *G01C 21/3617* (2013.01); *G01C 21/3691* (2013.01); *F01N 2900/0402* (2013.01); *F01N 2900/102* (2013.01); *F01N 2900/12* (2013.01); *F01N 2900/1606* (2013.01)

(58) Field of Classification Search
CPC ............ G01C 21/3469; G01C 21/3415; G01C 21/3484; G01C 21/3492; G01C 21/3611; G01C 21/3617; G01C 21/3691; F01N 3/0238; F01N 3/027; F01N 2900/1606
USPC .................................... 701/33.4, 410, 454
See application file for complete search history.

(56) References Cited

U.S. PATENT DOCUMENTS

| | | | |
|---|---|---|---|
| 8,424,294 | B2 | 4/2013 | Schumacher et al. |
| 2011/0225949 | A1 | 9/2011 | Tewari et al. |
| 2016/0075333 | A1 | 3/2016 | Sujan et al. |

(Continued)

FOREIGN PATENT DOCUMENTS

GB 2479196 A 10/2011

OTHER PUBLICATIONS

Upadhyay, D. et al., "Systems and Methods for Particulate Filter Regeneration," U.S. Appl. No. 15/606,898, filed May 26, 2017, 77 pages.

*Primary Examiner* — Gertrude Arthur Jeanglaude
(74) *Attorney, Agent, or Firm* — Julia Voutyras; McCoy Russell LLP

(57) ABSTRACT

Methods and systems are provided for maintaining a database with details of frequently travelled routes and selecting a travel route for a vehicle from the database based on particulate filter regeneration requirements. In one example, a method may include selecting one or more routes from the database based on a current particulate filter soot level, fuel efficiency, travel time, operator behavior, etc., ranking the routes based on the particulate filter regeneration efficiency of each of the one or more routes. At vehicle key-off, the database may be updated with information regarding the travelled route including a level of particulate filter regeneration achieved during the drive cycle.

20 Claims, 8 Drawing Sheets

(56) References Cited

U.S. PATENT DOCUMENTS

2016/0076333 A1    3/2016  Atkins et al.
2016/0201533 A1    7/2016  Upadhyay et al.
2016/0377449 A1*  12/2016  Gerlach ............. G01C 21/3617
                                                                701/424

* cited by examiner

|  | $S_{D0}$ | $S_{D1}$ | $S_{D2}$ |
|---|---|---|---|
| $S_{D0}$ | 0.70 | 0.20 | 0.10 |
| $S_{D1}$ | 0.25 | 0.50 | 0.25 |
| $S_{D2}$ | 0.25 | 0.25 | 0.50 |

| State | RIF |
|---|---|
| $S_{D0}$ | $f_0$ |
| $S_{D1}$ | $f_1$ |
| $S_{D2}$ | $f_2$ |

FIG. 8

| Weightage | Cost function | $f_0$ | $f_1$ | $f_2$ |
|---|---|---|---|---|
| $W_1$ | Regen level | 0.20 | 0.25 | 0.35 |
| $W_2$ | Regen cost | 0.20 | 0.25 | 0.15 |
| $W_3$ | Trip fuel usage | 0.20 | 0.125 | 0 |
| $W_4$ | Trip duration | 0.20 | 0.125 | 0 |
| $W_5$ | Regen termination probability | 0.20 | 0.25 | 0.5 |

FIG. 9

SYSTEMS AND METHODS FOR PARTICULATE FILTER REGENERATION

FIELD

The present description relates generally to methods and systems for selecting a travel route for a vehicle from a database based on particulate filter regeneration requirements.

BACKGROUND/SUMMARY

Emission control devices, such as particulate filters (PF), may reduce the amount of soot emissions from an internal combustion engine by trapping soot particles. Such devices may be passively regenerated during operation of the engine to decrease the amount of trapped particulate matter. Regeneration is typically achieved by raising a temperature of the PF to a predetermined level for a sustained period, while flowing exhaust gas of a defined composition through the PF in order to burn or oxidize the trapped particulate matter. However, during vehicle operation, conditions for sustained full regeneration of the PF may not be available. For example, during urban driving conditions which include frequent idle stops and light load engine operation, frequent premature terminations of regeneration may occur. The premature terminations may result in the need for active regeneration, leading to an increased regeneration fuel penalty.

Various approaches are provided for regenerating a PF during a vehicle drive cycle. In one example, as shown in US20160075333, Sujan et al. disclose a method to compute a recommended route for vehicle travel taking into account the regeneration requirement of an exhaust after-treatment device. Factors that are considered during route computation include load information of the vehicle, traffic information, and a cost strategy. Simulations are carried out to select a preferred route which is then provided to the vehicle operator.

However, the inventors herein have recognized potential disadvantages with the above approach. As one example, in the approach of Sujan et al., when the driver does not provide a destination, it may be difficult to suggest a route of travel that enables sufficient regeneration. Also, during conditions when an operator starts on the recommended route but takes a detour, the resulting route may have a lower regeneration efficiency than was intended. Further, operator driving history, driving characteristics, and driving preferences may significantly affect the decision of the operator to accept the route that is recommended by the vehicle controller. As a result, the PF may remain insufficiently regenerated.

In one example, the issues described above may be addressed by an engine method, comprising: learning, after each drive cycle, a particulate filter regeneration efficiency as a function of one or more characteristics of a travelled route and operator behavior over the travelled route, updating a database based on the learning, and at onset of a drive cycle, displaying to an operator one or more routes selected from the database, the selection based on a particulate filter soot load at the onset of the drive cycle. In this way, by providing route recommendations to a vehicle operator to enable sufficient exhaust after-treatment device regeneration based on operator driving characteristics and history, PF regeneration may be better scheduled.

As one example, a vehicle controller may develop a route database for a vehicle operator as a function of routes that are frequently used, along with operator driving characteristics on each route. Each time a trip is completed, the database may be updated with drive information including origin and destination details, route details such as route terrain, grade, day of week and time of day at which travel occurs, vehicle stops incurred during the route and duration of each stop, traffic information for the route as a function of time of travel, engine operating conditions on route, fuel consumption, duration of travel, possible or actual degree of PF regeneration achieved on traveled route, operator driving characteristics (e.g., aggressiveness and pedal actuation frequency), etc. The different routes may be stored in the database and ranked in terms of one or more parameters such as fuel efficiency, duration of travel, and achievable PF regeneration level. On each drive cycle, the controller may receive input regarding a final destination from the operator (such as via a navigation system). Responsive to the operator input, and further based on the current soot level of the PF, one or more routes may be selected from the database and hierarchically displayed to the vehicle operator.

For example, when the PF soot level is lower than a threshold and PF regeneration is not desired during the upcoming drive cycle, the selected routes that are displayed may be ranked based on the time taken to reach the destination and/or fuel cost, and the recommended route may be selected independent of its ability to complete PF regeneration. Thus, the recommended route at the top of the list may be a route that enables the destination to be reached in the shortest amount of time or using the least amount of fuel. As another example, when the PF soot level is higher than a threshold and PF regeneration is desired during the upcoming drive cycle, the selected routes that are displayed may be first ranked based on their ability to complete PF regeneration. Then routes may be further weighted based on their fuel economy. Thus, the recommended route at the top of the list may be a route that enables the destination to be reached while providing the highest degree of regeneration and while providing some degree of fuel economy. The subsequent route may provide a relatively lower degree of regeneration while still providing some degree of fuel economy, and so on. Navigational instructions may then be provided based on the operator selection. However, if a final destination is not provided by the operator, an expected destination may be predicted based on the operator's drive history (e.g., based on destinations commonly frequented on the given day of the week, and the given time of the day) and a route selection may be provided based on the expected destination. The vehicle controller may divide the route into route segments and predict an expected destination for an initial route segment and provide a recommended route that enables PF regeneration on the initial route segment. Then, as the operator starts driving, the expected destination for one or more subsequent route segments, and a recommended route for each route segment, may be dynamically updated using stochastic dynamic programming. Similarly, when the operator starts on the recommended route and takes a detour, upcoming route segments may be predicted based on the drive history in the database, and one or more routes may be recommended from the database using stochastic dynamic programming.

In this way, by maintaining a database of frequently traveled routes with information including the actual degree of PF regeneration attained on each route, it may be possible to select one or more routes from a database based on PF regeneration requirement during a future drive cycle. By dynamically selecting and suggesting a travel route that enables PF regeneration while taking into account an operator's driving history and the operator's driving preferences, the likelihood that an operator will follow the recommended route is increased. Consequently, a higher degree of PF regeneration may be facilitated without substantial increase in fuel consumption and travel duration. The technical effect of using stochastic dynamic programming to predict segments of an upcoming route based on drive history and drive statistics stored in the route database is that it may be possible to schedule PF regenerations even during trips where a final destination has not been specified by the operator or when the operator has taken a detour from the selected route. In this way, by opportunistically regenerating the PF, over-loading of soot in the PF may be reduced, thereby improving engine performance and PF health.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 8 shows a table of regeneration impact factors corresponding to each state of mind of the driver.

FIG. 9 shows a table of scaling factors corresponding to each regeneration impact factor for weightages of cost functions associated with a route.

DETAILED DESCRIPTION

Figure 1:
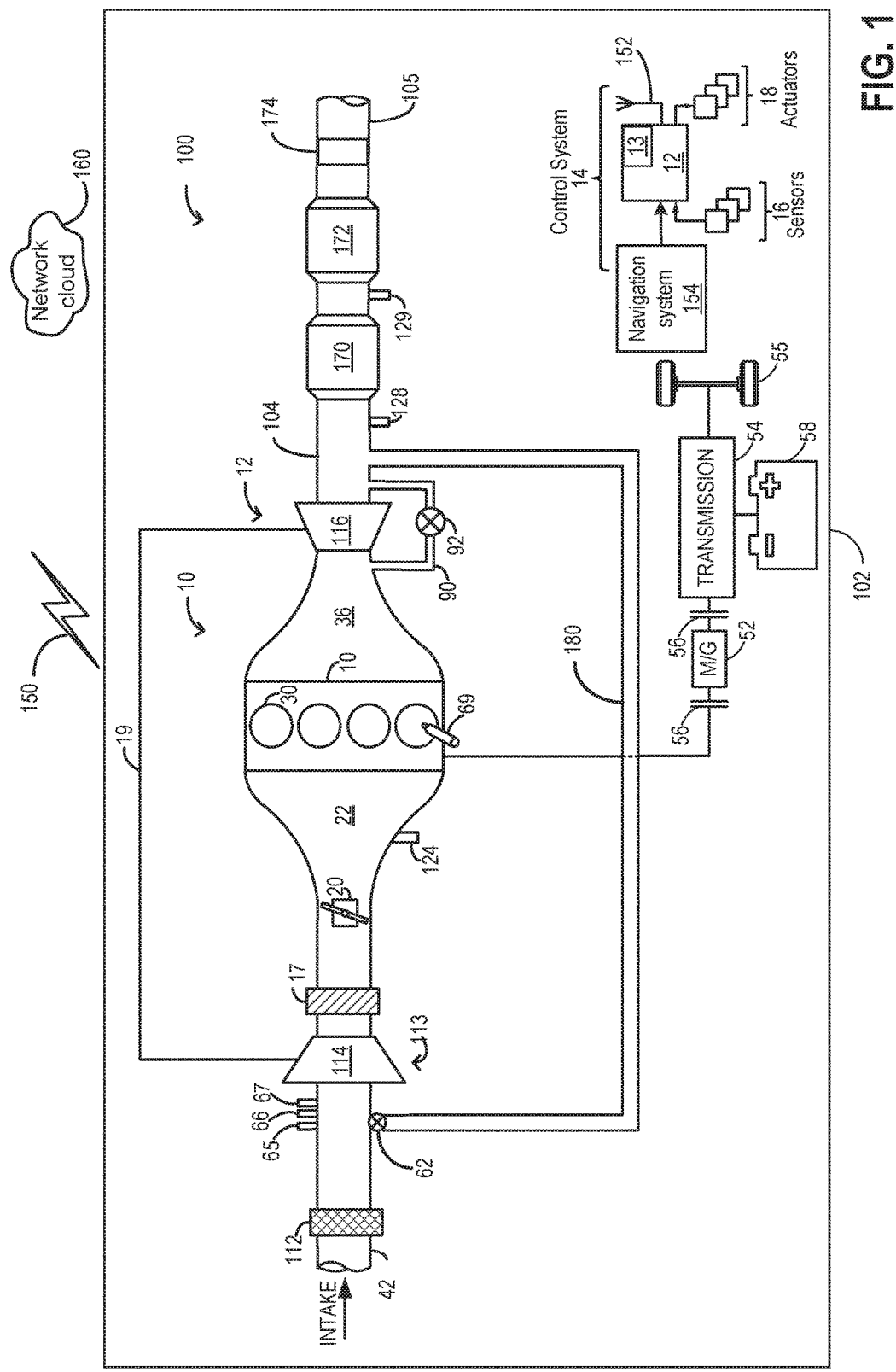
FIG. 1 shows an example embodiment of an engine system including a particulate filter.
Figure 5A:
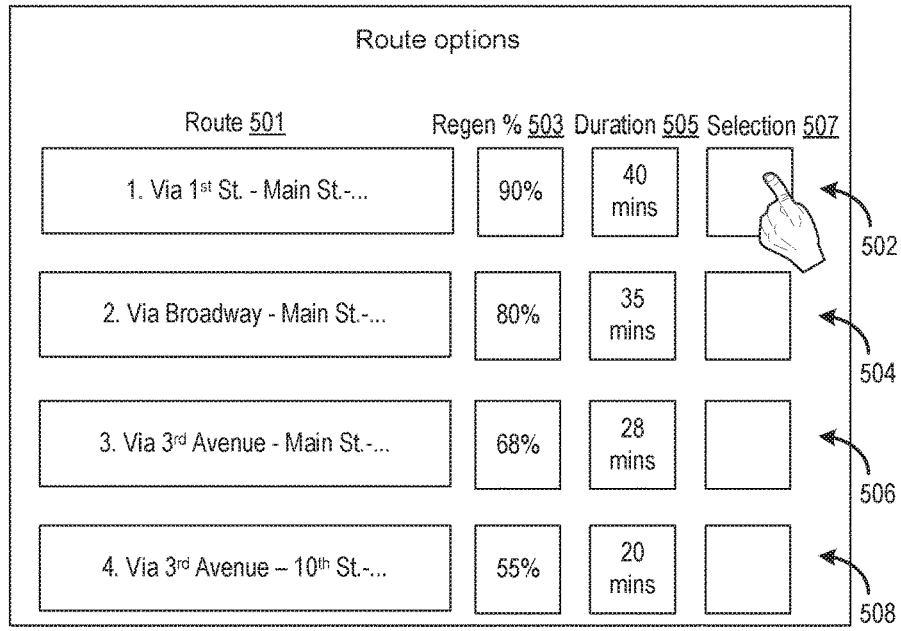
FIG. 5A shows a first example display of suggested routes based on PF regeneration requirements and an initial driver state of mind.
Figure 5B:
FIG. 5B shows a second example display of suggested routes based on PF regeneration requirements and an updated driver state of mind.
Figures 6, 7:
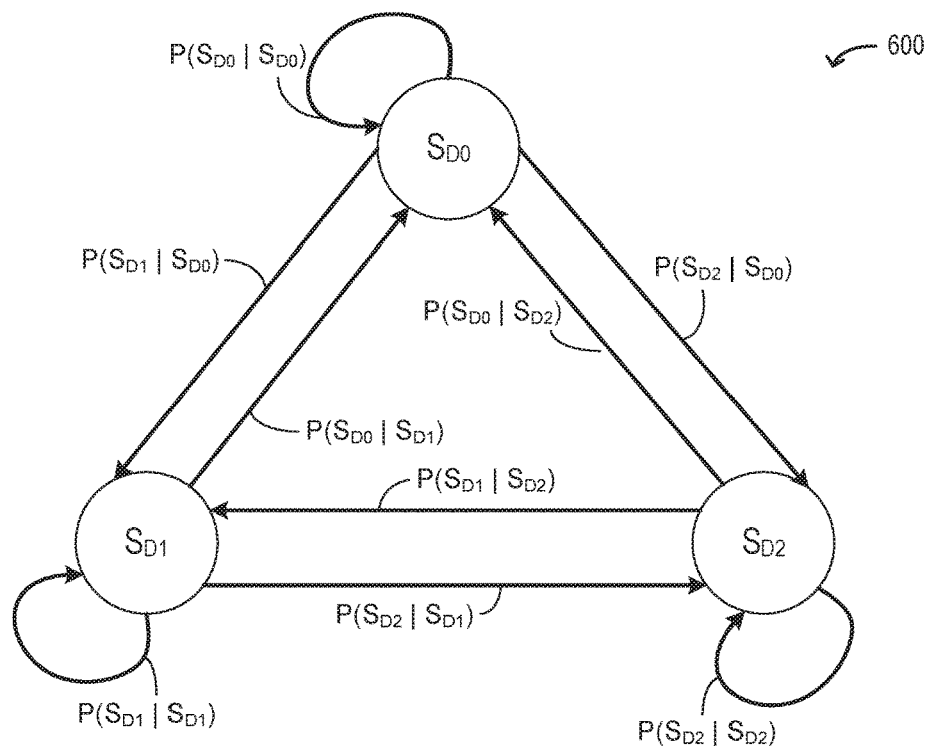
FIG. 6 shows a state machine diagram for transition of the state of mind of the driver.
FIG. 7 shows a transition matrix for changes in the driver state of mind.
Figure 10:
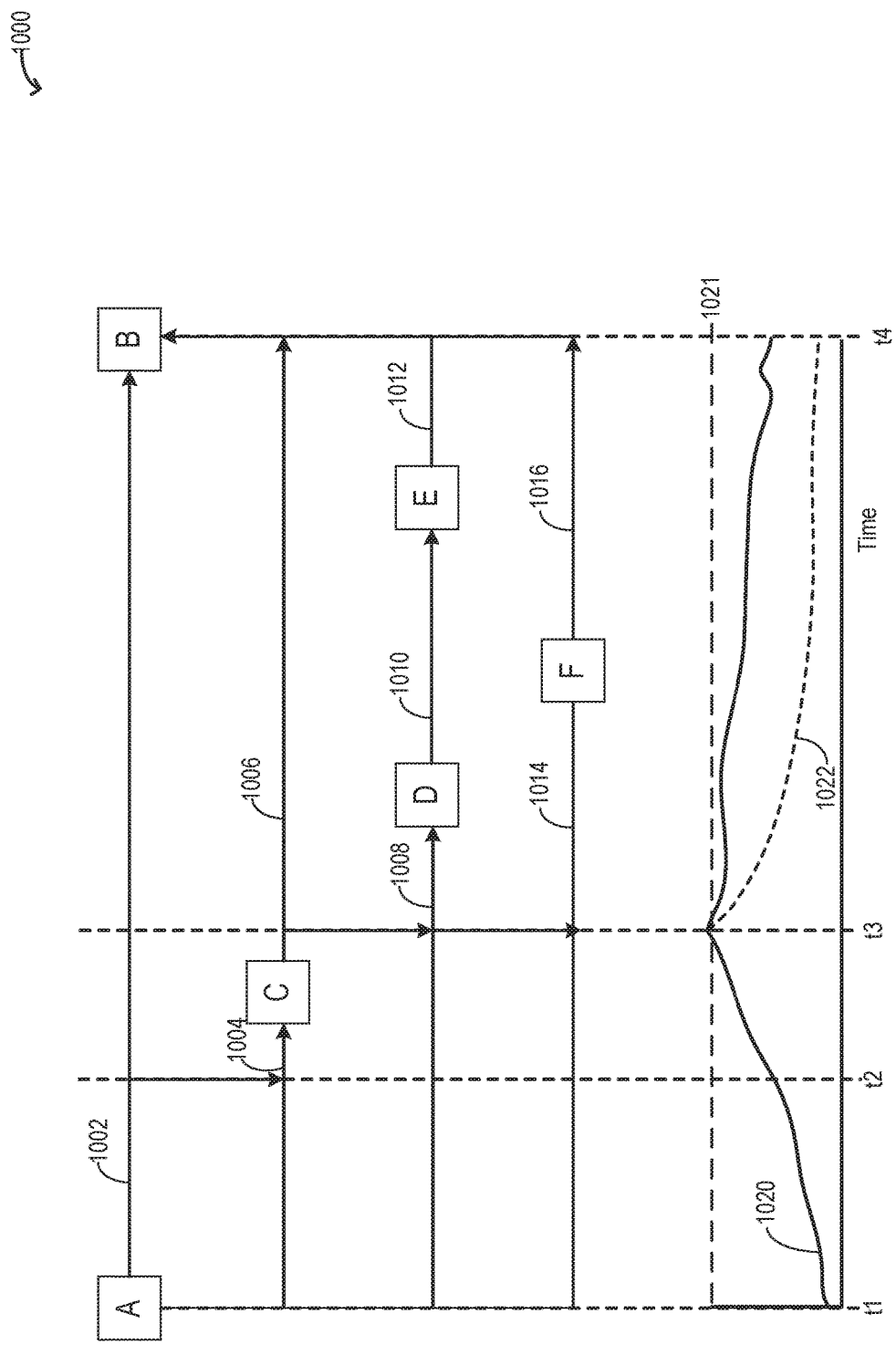
FIG. 10 shows an example of prediction and dynamic selection of a proposed route for PF regeneration.

The following description relates to systems and methods for selecting a route from a database containing details of frequently travelled routes and driver behavior for optimal particulate filter regeneration. An example engine system comprising a particulate filter is shown in FIG. 1. An engine controller may be configured to perform control routines, such as the example routine of FIG. 2, to select a route of travel from a database based on PF regeneration requirements. A control routine, such as the example of FIG. 3, may be performed to estimate a current state of mind of the driver and to further determine the influence of the current state of mind on selection of travel routes optimal for PF regeneration. Following each drive cycle, the controller may perform a routine, such as the example routine of FIG. 4, to update the database with information learnt during the drive cycle. FIGS. 5A and 5B show example displays of suggested routes based on PF regeneration requirements and a driver state of mind. As shown in the state machine diagram of FIG. 6, the driver state of mind may change between multiple states during a drive cycle and such changes may be estimated based on a transition matrix, as shown in FIG. 7. The distinct driver states of mind may correspond to distinct regeneration impact factors as tabulated in FIG. 8 and these regeneration impact factors may affect the weightages of cost functions for route determination as tabulated in FIG. 9. A prophetic example including prediction and selection of proposed travel routes based on PF regeneration requirements is shown at FIG. 10.

FIG. 1 schematically shows aspects of a vehicle system 102 with an example engine system 100 including an engine 10. In one example, the engine system 100 may be a diesel engine system. In one example, the engine system 100 may be a gasoline engine system. In the depicted embodiment, engine 10 is a boosted engine coupled to a turbocharger 113 including a compressor 114 driven by a turbine 116. Specifically, fresh air is introduced along intake passage 42 into engine 10 via air cleaner 112 and flows to compressor 114. The compressor may be any suitable intake-air compressor, such as a motor-driven or driveshaft driven supercharger compressor. In engine system 10, the compressor is a turbocharger compressor mechanically coupled to turbine 116 via a shaft 19, the turbine 116 driven by expanding engine exhaust.

As shown in FIG. 1, compressor 114 is coupled, through charge-air cooler (CAC) 17 to throttle valve 20. Throttle valve 20 is coupled to engine intake manifold 22. From the compressor, the compressed air charge flows through the charge-air cooler 17 and the throttle valve to the intake manifold. In the embodiment shown in FIG. 1, the pressure of the air charge within the intake manifold is sensed by manifold air pressure (MAP) sensor 124.

One or more sensors may be coupled to an inlet of compressor 114. For example, a temperature sensor 65 may be coupled to the inlet for estimating a compressor inlet temperature, and a pressure sensor 66 may be coupled to the inlet for estimating a compressor inlet pressure. As another example, a humidity sensor 67 may be coupled to the inlet for estimating a humidity of aircharge entering the compressor. Still other sensors may include, for example, air-fuel ratio sensors, etc. In other examples, one or more of the compressor inlet conditions (such as humidity, temperature, pressure, etc.) may be inferred based on engine operating conditions. In addition, when exhaust gas recirculation (EGR) is enabled, the sensors may estimate a temperature, pressure, humidity, and air-fuel ratio of the aircharge mixture including fresh air, compressed air, and recirculated exhaust residuals received at the compressor inlet.

A wastegate actuator 92 may be actuated open to dump at least some exhaust pressure from upstream of the turbine to a location downstream of the turbine via wastegate 90. By reducing exhaust pressure upstream of the turbine, turbine speed can be reduced, which in turn helps to reduce compressor surge.

Intake manifold 22 is coupled to a series of combustion chambers 30 through a series of intake valves (not shown). The combustion chambers are further coupled to exhaust manifold 36 via a series of exhaust valves (not shown). In the depicted embodiment, a single exhaust manifold 36 is shown. However, in other embodiments, the exhaust manifold may include a plurality of exhaust manifold sections. Configurations having a plurality of exhaust manifold sections may enable effluent from different combustion chambers to be directed to different locations in the engine system.

In one embodiment, each of the exhaust and intake valves may be electronically actuated or controlled. In another embodiment, each of the exhaust and intake valves may be cam actuated or controlled. Whether electronically actuated or cam actuated, the timing of exhaust and intake valve opening and closure may be adjusted as needed for desired combustion and emissions-control performance.

Combustion chambers 30 may be supplied one or more fuels, such as gasoline, alcohol fuel blends, diesel, biodiesel, compressed natural gas, etc., via injector 69. Fuel may be supplied to the combustion chambers via direct injection, port injection, throttle valve-body injection, or any combination thereof. In the combustion chambers, combustion may be initiated via spark ignition and/or compression ignition.

As shown in FIG. 1, exhaust from the one or more exhaust manifold sections is directed to turbine 116 to drive the turbine. The combined flow from the turbine and the wastegate then may flow through exhaust after-treatment devices 170 and 172. In one example, the first exhaust after-treatment devices 170 may be a light-off catalyst, and the second exhaust after-treatment devices 172 may be a particulate filter such as a regeneratable particulate filter (PF). As an example, the PF may be a diesel particulate filter coupled to the exhaust passage 104 of a diesel engine. In another example, the PF may be a gasoline particulate filter coupled to the exhaust passage 104 of a gasoline engine. The PF may be manufactured from a variety of materials including cordierite, silicon carbide, and other high temperature oxide ceramics. As such, the PF has a finite capacity for holding soot. Therefore, the PF may need to be periodically regenerated in order to reduce the soot deposits in the filter so that flow resistance due to soot accumulation does not reduce engine performance. Passive PF regeneration may be favorably carried out during certain engine operating conditions such as during higher engine load when exhaust gas flowing through the PF is of a defined composition and is above a threshold temperature, in order to burn or oxidize the trapped particulate matter. During passive PF regeneration, the soot may be opportunistically burnt due to the higher exhaust temperature and also by the presence of a desired amount of oxygen in the exhaust. Filter regeneration may be accomplished by actively heating the filter, by flowing electric current, to a temperature that will burn soot particles at a faster rate than the deposition of new soot particles, for example, 400-600° C. such as during active PF regeneration. During active regeneration, spark timing may be retarded or fuel enrichment may be carried out to increase exhaust temperature. Therefore, active PF regeneration may increase fuel consumption and parasitic loss of energy (by supplying electricity to the filter). In comparison, during passive regeneration, active heating of the PF using electric current, spark retard, and/or fuel enrichment may not be desired. In one example, the PF can be a catalyzed particulate filter containing a washcoat of precious metal, such as platinum, to lower soot combustion temperature and also to oxidize hydrocarbons and carbon monoxide to carbon dioxide and water.

In one example, the exhaust after-treatment device 170 may be configured to trap $NO_x$ from the exhaust flow when the exhaust flow is lean and to reduce the trapped $NO_x$ when the exhaust flow is rich. In other example, the exhaust after-treatment device 170 may be configured to disproportionate $NO_x$ or to selectively reduce $NO_x$ with the aid of a reducing agent. In yet another example, the exhaust after-treatment device 170 may be configured to oxidize residual hydrocarbons and/or carbon monoxide in the exhaust flow. Different exhaust after-treatment catalysts having any such functionality may be arranged in wash coats or elsewhere in the exhaust after-treatment stages, either separately or together. All or part of the treated exhaust from the exhaust after-treatment devices 170 and 172 may be released into the atmosphere via main exhaust passage 104 after passing through a muffler 174.

Exhaust gas recirculation (EGR) delivery passage 180 may be coupled to the exhaust passage 104 downstream of turbine 116 to provide low pressure EGR (LP-EGR) to the engine intake manifold, upstream of compressor 114. An EGR valve 62 may be coupled to the EGR passage 180 at the junction of the EGR passage 180, and the intake passage 42. EGR valve 62 may be opened to admit a controlled amount of exhaust to the compressor inlet for desirable combustion and emissions control performance. EGR valve 62 may be configured as a continuously variable valve or as an on/off valve. In further embodiments, the engine system may include a high pressure EGR flow path wherein exhaust gas is drawn from upstream of turbine 116 and recirculated to the engine intake manifold, downstream of compressor 114.

One or more sensors may be coupled to EGR passage 180 for providing details regarding the composition and condition of the EGR. For example, a temperature sensor may be provided for determining a temperature of the EGR, a pressure sensor may be provided for determining a pressure of the EGR, a humidity sensor may be provided for determining a humidity or water content of the EGR, and an air-fuel ratio sensor may be provided for estimating an air-fuel ratio of the EGR. Alternatively, EGR conditions may be inferred by the one or more temperature, pressure, humidity, and air-fuel ratio sensors 65-67 coupled to the compressor inlet. In one example, air-fuel ratio sensor 57 is an oxygen sensor.

A plurality of sensors, including an exhaust temperature sensor 128 and an exhaust oxygen sensor, and exhaust pressure sensor 129 may be coupled to the main exhaust passage 104. The oxygen sensor may be linear oxygen sensors or UEGO (universal or wide-range exhaust gas oxygen), two-state oxygen sensors or EGO, HEGO (heated EGO), a NOx, HC, or CO sensors.

Engine system 100 may further include control system 14. Control system 14 is shown receiving information from a plurality of sensors 16 (various examples of which are described herein) and sending control signals to a plurality of actuators 18 (various examples of which are described herein). A navigation system 154 such as global positioning system (GPS) may be coupled to the control system 14 to determine location of the vehicle 102 at key-on and at any other instant of time. The navigation system may be connected to an external server and/or network cloud 160 via wireless communication 150. The navigation system 154 may determine the current location of the vehicle 102 and obtain ambient condition data (such as temperature, pressure, etc.) and road information (such as road gradient) from a network cloud 160. The controller 12 may be coupled to a wireless communication device 152 for direct communication of the vehicle 102 with a network cloud 160. At completion of a drive cycle, the database 13 may be updated with route segment information including driver behavior, driver states of mind, a level of particulate filter regeneration achieved, engine operating conditions, date and time information, and traffic information. Further, details of the trip including origin and destination, stops during travel and duration of each stop, road gradient (terrain) of the route, fuel consumption, duration of travel, driver behavior, etc. may be stored in a database 13 within the controller 12. Information regarding the route and traffic may be learned from the navigation system 154 and the external cloud 160 via wireless communication 150. The different routes in the database may be compared and ranked in terms of fuel efficiency, duration of travel, and achievable PF regeneration level. Details regarding a driver driving pattern may be retrieved from the controller's memory and used for ranking the routes. Also, the driving pattern of the vehicle driver may be learned over a number of vehicle drive cycles based on one or more of frequent trip time patterns, habitual probability patterns, route based statistical profile, and environmental attribute profiles. Other statistical profiles, different states of mind of the driver, and conditions for transitioning from one state of mind to another may be learned and stored in the database 13. The engine operating parameters may be estimated via inputs from one or more sensors 16 and the information may be added to the database 13. Details of updating the database 13 are discussed in details with relation to FIG. 4.

At the onset of a drive cycle (at vehicle key-on), based on PF soot level, a requirement for PF regeneration during the upcoming drive cycle may be assessed and in response to the driver providing a destination (such as via an input to an on-board navigation system), one or more routes may be selected from the database 13 based on the driver state of mind, to facilitate a higher degree of PF regeneration while optimizing fuel efficiency and time of travel. The route selection may be further based on a driver selected cost function including highest fuel efficiency and lowest travel time for the drive cycle. The one or more routes selected may then be ranked as a weighted function of each of a particulate filter regeneration efficiency, a probability of completion of a PF regeneration event, a fuel efficiency, and a travel time of each of the one or more routes. As an example, if based on the current PF soot level, it is inferred that a PF regeneration is desired during the upcoming drive cycle, the highest ranked route displayed to the operator may be a route that enables the destination to be reached while providing the highest degree of regeneration and while providing some degree of fuel economy. During situations when the driver does not select a route from the one or more routes recommended (displayed) to the driver, an upcoming route segment may be dynamically predicted based on a driving history (of driver) retrieved from the database. Also, the driver may select a route from the one or more recommended routes and initiate travel along the route, and then deviate from the selected route. During such deviations, the controller may dynamically predict an upcoming route segment based on a driver driving history (such as preferred routes of travel during a specific time of day or day of week) as retrieved from the database. One or more routes or route segments may be selected from the database based on the predicted destination, ranked in terms of their particulate filter regeneration efficiency, probability of completion of a PF regeneration event, fuel efficiency, and travel time of each of the one or more routes and displayed to the driver. Details of route selection based on information stored in the database 13 are discussed with relation to FIG. 2.

In this way, in response to a driver destination selection indicated via a display of a vehicle, a particulate filter soot load may be estimated, a current location of the vehicle may be determined, one or more routes may be retrieved from the current location to the destination from a database, the one or more routes may be ranked based on each of a particulate filter regeneration efficiency, fuel efficiency, and time of travel of each route; and the one or more routes to the selected destination may be displayed to the driver in order of their rank.

The selection and ranking of the one or more routes may be further based on a driver state of mind. A driver state of mind may represent a real-time driving behavior of the driver, such as in one state of mind the driver may drive more aggressively while in a different state of mind, the driver may be more relaxed during the drive cycle. At an onset of a drive cycle, a first driver state of mind may be selected from a plurality of driver states of mind stored in the database 13 based on a past driving history of the driver, traffic conditions at the drive cycle origin, and environmental conditions at the drive cycle origin including temperature, humidity, precipitation, etc. The past driving history of the driver includes routes traveled by the operator as a function of one or more of a time of a day, the day of a week, the drive cycle origin and destination, and drive characteristics including frequency of brake usage, average acceleration force used, and average lane change frequency. The first driver state of mind may correspond to a first particulate filter regeneration factor. Based on the first particulate filter regeneration factor, the selection, and ranking of the one or more routes may be updated. Updating the ranking of the one or more routes includes, ranking each of the one or more routes based on a weighted function of each of the respective regeneration completion efficiencies, a probability of completion of a particulate filter regeneration event, fuel efficiency, and a time to destination of each of the one or more routes, the weighted function scaled based on the first regeneration factor. Once a driver selects a route from the ranked one or more routes, navigational instructions for the operator selected route may be displayed to the driver.

As the driver travels along the driver selected route, real-time driver interactions with traffic including one or more of frequency of stops, frequency of lane changes, accelerator pedal input, and brake input during the drive cycle may be learned. Based on the learned real-time driver interactions with traffic and a comparison of the real-time driver interactions with traffic during travel along the driver selected route relative to the past driving history, the driver state of mind may be updated from the first state to a second state of mind, the second state of mind also selected from the database 13. The updated, second driver state of mind may correspond to a second particulate filter regeneration factor. In response to the change in the driver state of mind, the ranking of the one or more routes may be updated as the weighted function of each of the respective regeneration completion efficiencies, the probability of completion of the particulate filter regeneration event, fuel efficiency, and the time to destination of each of the one or more routes may be scaled based on the second regeneration factor. For example, in the first ranking, the highest ranked route displayed to the operator may be a route that provides the highest degree of PF regeneration, however, once the ranking is updated in response to the change in the driver state of mind, the previously highest ranked route may no longer provide the highest degree of PF regeneration and a different route enabling the highest degree of PF regeneration may now be ranked first. The updated ranking of the one or more routes may then be displayed to the driver for further selection. At completion of the drive cycle, a degree of PF regeneration attained during the drive cycle may be learned and the database 13 may be updated with the learned degree of PF regeneration attained for the drive cycle, the first driver state of mind, and the updated driver state of mind.

The control system 14 may include a controller 12. The controller 12 may receive input data from various sensors 18, process the input data, and trigger various actuators 81 in response to the processed input data based on instruction or code programmed therein corresponding to one or more routines. As one example, sensors 16 may include exhaust gas oxygen sensor located upstream of the turbine 116, pedal position sensor, MAP sensor 124, exhaust temperature sensor 128, exhaust pressure sensor 129, oxygen sensor, compressor inlet temperature sensor 65, compressor inlet pressure sensor 66, and compressor inlet humidity sensor 67. Other sensors such as additional pressure, temperature, air-fuel-ratio, and composition sensors may be coupled to various locations in engine system 100. The actuators 81 may include, for example, throttle 20, EGR valve 62, wastegate 92, and fuel injector 69. As an example, during key-on, based on a soot level on the PF as estimated via the exhaust pressure sensor 129, the controller may select an optimal route for the drive cycle based on information stored in the database and input from the navigation system 154 and the network cloud 160. The controller may then display the optimal route to the driver and if the route is selected, a level of PF regeneration achieved during the trip may be monitored and learned.

In some examples, vehicle 102 may be a hybrid vehicle with multiple sources of torque available to one or more vehicle wheels 55. In other examples, vehicle 102 is a conventional vehicle with only an engine, or an electric vehicle with only electric machine(s). In the example shown, vehicle 102 includes engine 10 and an electric machine 52. Electric machine 52 may be a motor or a motor/generator. Crankshaft of engine 10 and electric machine 52 are connected via a transmission 54 to vehicle wheels 55 when one or more clutches 56 are engaged. In the depicted example, a first clutch 56 is provided between crankshaft 140 and electric machine 52, and a second clutch 56 is provided between electric machine 52 and transmission 54. Controller 12 may send a signal to an actuator of each clutch 56 to engage or disengage the clutch, so as to connect or disconnect crankshaft from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from a traction battery 58 to provide torque to vehicle wheels 55. Electric machine 52 may also be operated as a generator to provide electrical power to charge battery 58, for example during a braking operation.

In this way, the components of FIG. 1 enables a vehicle system comprising: a vehicle, a navigation system wirelessly connected to an external network, a display, an engine including an intake system and an exhaust system, the exhaust system including a particulate filter (PF) coupled to an exhaust passage and a pressure sensor coupled to the exhaust passage upstream of the particulate filter, and a controller with computer readable instructions stored on non-transitory memory for: at an onset of a drive cycle, displaying a first route based on PF load and a first driver state of mind, and responsive to driver interactions with traffic while travelling on the first route, displaying a plurality of updated routes based on a second driver state of mind, wherein the first driver state of mind is selected from a database based on each of the PF load and a driver history and a change from the first driver state of mind to the second driver state of mind is based on the driver interactions with traffic while traveling on the first route.

Figure 2:
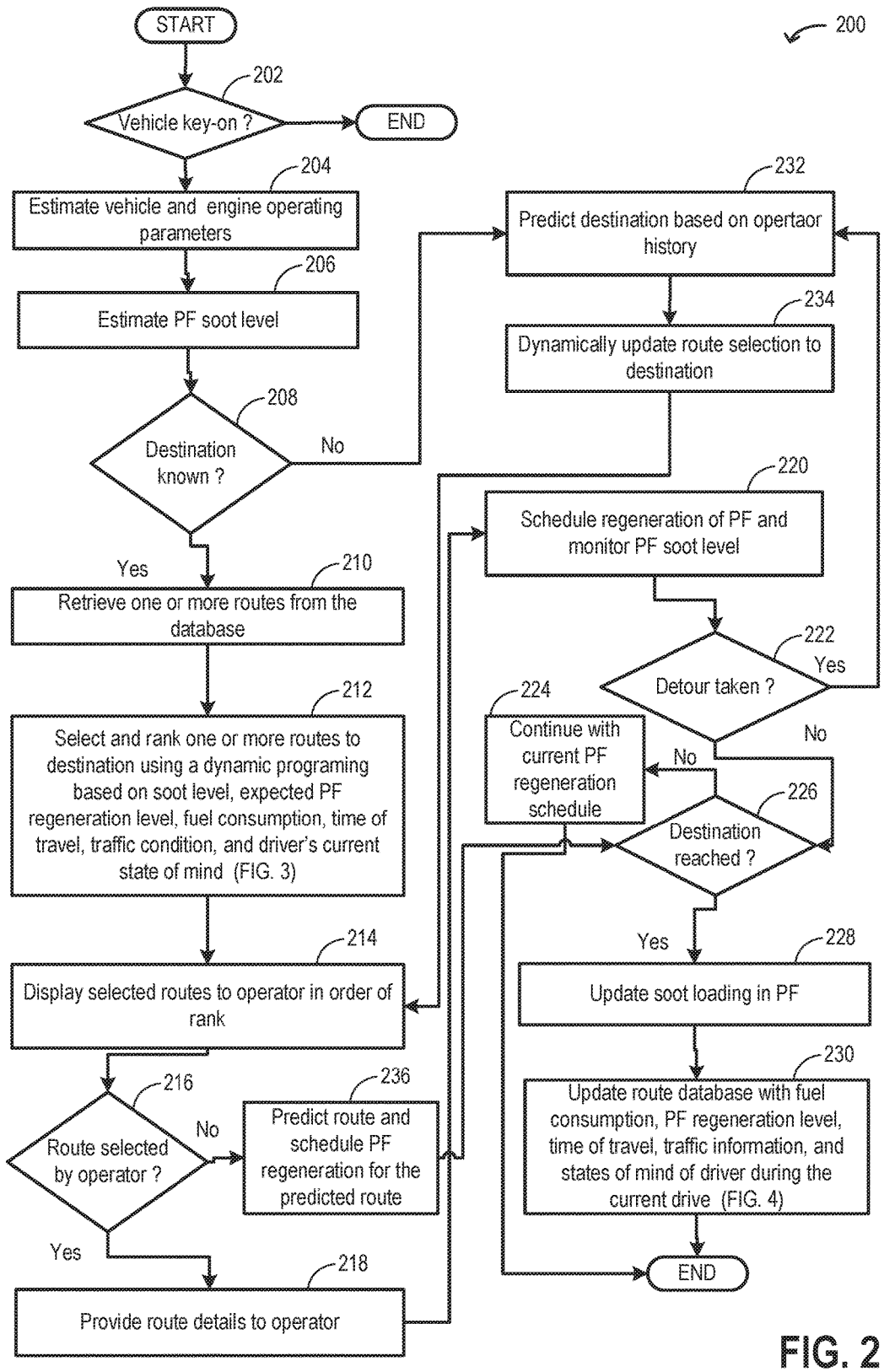
FIG. 2 shows a flow chart illustrating an example method that may be implemented for selecting a route of travel based on PF regeneration requirements.

FIG. 2 shows an example method 200 for selecting a route of travel based on particulate filter (PF) regeneration requirements. Instructions for carrying out method 200 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

At 202, the routine may include determining if a vehicle key-on event is detected. For example, it may be determined that the vehicle driver has expressed intent to start vehicle operation. As such, by confirming a vehicle key-on event, an upcoming vehicle drive cycle is indicated. While referred to herein as a vehicle "key-on" event, it will be appreciated that the driver may indicate intent to operate the vehicle with or without the use of a key. For example, vehicle operation may be initiated by inserting a key (active key) into an ignition slot and moving the slot to an "ON" position. Alternatively, vehicle operation may be initiated when a key (passive key) is within a threshold distance of the vehicle (e.g., in the vehicle). As another example, vehicle operation may be initiated when the driver presses an ignition button to an "ON" position. Still other approaches may be used by a driver to indicate intent to operate the vehicle. As such, vehicle driver driving patterns may only be learned when the vehicle is operating. Thus, if a vehicle key-on event is not confirmed, and therefore an upcoming vehicle drive cycle, is not confirmed, the method may end and PF regeneration may not be carried out.

If a key-on event is confirmed, at 204, current vehicle and engine operating conditions may be estimated and/or measured. These may include, for example, engine speed, vehicle speed, engine temperature, engine load, ambient conditions (ambient humidity, temperature, and barometric pressure), boost level, exhaust temperature, manifold pressure, manifold air flow, battery state of charge, etc.

At 206, the level of soot accumulated in an exhaust PF may be estimated based on input from an exhaust pressure sensor (such as pressure sensor 129 in FIG. 1) positioned upstream of the PF. As the soot level in the PF increases, the exhaust back pressure may increase pumping losses thereby affecting engine performance and increasing fuel consumption. Therefore, if the soot level increases to above a threshold, the PF may be regenerated by burning at least a portion of the soot deposited on it. However, passive regeneration of PF may be adversely affected during engine operating conditions such as idling, lower engine load, and lower engine temperature. Incomplete or aborted PF regenerations may adversely affect engine efficiency. Therefore, when a new trip is initiated, a route of travel may be selected taking into consideration the soot level on the PF such that PF regeneration may be opportunistically carried out during the trip.

At 208, the routine includes determining if a destination has been specified by the driver. The driver may specify a destination via an input to the on-board navigation system. If it is determined that the destination is known, the routine proceeds to step 210 to retrieve one or more routes between the origin and the destination from a database (such as database 13 in FIG. 1). The origin (such as coordinates, geographical location) may be determined from the on-board navigation system or from a network cloud via a wireless connection. The database is maintained updated with information of frequently travelled vehicle routes. Information including origin and destination, routes taken, stops during trip and duration of each stop, traffic information for each route, day and time of travel, engine operating conditions, fuel consumption, duration of travel, possible degree of PF regeneration, driver driving characteristics, etc. may be available in the database. An example method of updating the database during each trip is elaborated with reference to FIG. 4. Given the current vehicle position and the destination (as indicated by the driver) there may be a plurality of possible routes available in the database.

At 212, one or more routes may be selected from the database for travel between the current vehicle position and the destination. A dynamic programming may be carried out to estimate the cost associated with each route. As an example, the cost function associated with a route may be estimated by Equation 1.

$$J_{A-B} = \Sigma_A{}^W w_1(1-E(\theta)) + w_2 m_{fuel}{}^{regen} + w_3 m_{fuel}{}^{A-B} + w_4 t_{A-B} + w_5 P(A_{bort}|\theta<\theta^*) \quad (1)$$

where $J_{A-B}$ is the total cost function (sum of individual cost functions) associated with a particular route from origin A and destination B, $E(\theta)$ is the expected PF regeneration level of this route from point A to B, $w_1$ is the weightage associated with the expected PF regeneration level of this route, $w_2 m_{fuel}{}^{regen}$ is the cost to heat the PF to a temperature at which regeneration may commence, $w_3 m_{fuel}{}^{A-B}$ is the fuel consumption for travel associated with the route from A to B including fuel usage due to back pressure related pumping losses with increasing soot load on the PF, $w_4 t_{A-B}$ is the time duration of the trip from A to B following the particular route, $P(A_{bort}|\theta<\theta^*)$ is the probability of a PF regeneration process to be terminated during travel from point A to B via this particular route, and $w_5$ is the weightage associated with the probability of PF regeneration termination.

The weightages $w_1$ and $w_5$ may be adjusted based on the PF soot level. In one example, when the current PF soot level is above a threshold and PF regeneration is desired during the upcoming drive cycle, each of the weightages $w_1$ and $w_5$ may be increased and the weightages $w_3$ and $w_4$ may be decreased in order to increase the cost functions of routes with lower expected PF regeneration level or with a higher probability of termination of the PF regeneration process. However, when PF regeneration is not desired during the upcoming drive cycle, the weightages $w_1$ and $w_5$ may be decreased while the weightages $w_3$ and $w_4$ may be increased in order to give preference to routes with lower time of travel and higher fuel efficiency.

The weightages $w_1$ and $w_5$ may be further adjusted based on a current state of mind of the driver. A state of mind of a driver may influence the driving characteristics such as accelerator pedal application and release frequency, gear change frequency, brake application frequency which may further affect PF regeneration. A state of mind of a driver may correspond to a regeneration impact factor (RIF) and each RIF may in turn correspond to a scaling factor for each of the weightages $w_1$ and $w_5$. In one example, if the driver is in a first state of mind during which his driving characteristics may be optimal for PF regeneration (such as lower pedal application and release frequency, lower gear change frequency, and lower brake application frequency), the corresponding RIF may result in an equal scaling factor for each of the weightages $w_1$ to $w_5$ such that the effect of the driver state of mind may not change the total cost function associated with the route. As an example, equal scaling factor of 0.2 may be assigned to each of the weightages $w_1$ to $w_5$. Since the scaling factors are equal for all the weightages (the sum of the scaling factors are always equal to one), it may be inferred that the state of mind of the driver may not have any detrimental effect on the total cost function of any route. In another example, if the driver is in a second state of mind during which his driving characteristics may adversely PF regeneration, the RIF corresponding to the second state of mind may result in unequal scaling factors for each of the weightages $w_1$ and $w_5$. In order to incorporate the adverse effect of the driver state of mind in the cost function estimation for the route, the corresponding RIF may result in a higher scaling factor for $w_1$ (the weightage associated with the expected PF regeneration level of this route) and $w_5$ (the weightage associated with the probability of PF regeneration termination) relative to scaling factors assigned to other weightages ($w_2$, $w_3$, and $w_4$). By assigning a higher scaling factor for $w_1$ and $w_5$, the individual cost functions relating to each of the expected PF regeneration level of this route and the probability of PF regeneration termination may be increased relative to the individual cost functions relating to other factors such as time of travel and fuel usage. In this way, the current state of mind of the driver may be quantitatively factored into estimation of the total cost function associated with each route between the origin and a destination. Details regarding a real-time determination of a driver state of mind and the influence of the driver state of mind on route selection is described in detail in FIG. 3.

As such, traffic information such as signal phase and timing information (SPaT), as available from the external server or the navigation system may be taken into account while estimating the probability of a PF regeneration process being terminated over a given drive cycle and to predict the duration of travel. For example, higher number of traffic stops and traffic congestion in general may increase both the probability of termination of a passive PF regeneration event and the duration of travel. The controller may determine each of the expected PF regeneration level and the probability of termination of the PF regeneration through a determination that directly takes into account traffic situation, such as increasing expected PF regeneration level and decreasing the probability of termination of the PF regeneration with a decrease in the number of traffic stops. The controller may alternatively determine each of the expected PF regeneration level and the probability of termination of the PF regeneration based on a calculation using a look-up table with the input being current traffic situation and the output being the expected PF regeneration level and the probability of termination of the PF regeneration.

Once the cost functions are estimated for the plurality of available routes between the origin and the destination, the routes may be ranked based on the cost function, the highest ranked route corresponding to the lowest cost function. In one example, when PF regeneration is desired during the upcoming drive cycle, such as when the PF soot level is higher than a threshold, a route with the highest expected PF regeneration level and lowest probability of termination of the regeneration event may be ranked highest. The highest ranked (recommended) route may be a route that enables the destination to be reached without any significant delay while providing the highest degree of regeneration and some degree of fuel economy. The subsequent route may provide a relatively lower degree of regeneration while still providing some degree of fuel economy, and so on. In another example, when PF regeneration is not desired during the upcoming drive cycle such as when the PF soot level is lower than the threshold, the selected routes that are displayed may be ranked based on the time taken to reach the destination and/or fuel cost, and the recommended route may be selected independent of its ability to complete PF regeneration. Thus, the highest ranked (recommended) route may be a route that enables the destination to be reached in the shortest amount of time or using the least amount of fuel.

Once the one or more routes have been selected from the database and ranked, at 214, the selected routes may be displayed in the order of their ranks to the driver. The screen and user interface of the on-board navigation system may be used to display the selected routes to the operator.

At 216, the routine includes determining if the driver has selected a route from the list of recommended (displayed) routes. If it is determined that the driver has selected one of the recommended routes, the routine proceeds to 218 wherein navigational instructions for the selected route is provided to the driver.

At 220, as the driver follows a selected route, in addition to occurrence of passive regeneration, the controller may also schedule an active regeneration of the PF during the travel from the origin to the destination. The scheduling may be based on the soot level and the upcoming road conditions and corresponding engine operating conditions. As an example, PF regeneration may be scheduled once the soot level increases to above a threshold level and the driving conditions are favorable for PF regeneration such as when the engine load is higher than a threshold load and the engine temperature is higher than a threshold temperature. During the scheduled PF regeneration, the temperature of the exhaust may be increased by routing electricity through the PF to burn the soot accumulated on the PF thereby reducing the soot load on the PF. The PF may be passively regenerated during the trip when the exhaust temperature is higher than a threshold and is of a desired chemical composition facilitating oxidation of the soot deposited on the PF.

At 222, the routine includes determining if the driver has taken a detour (deviation) from the expected route. Each of passive and active regeneration of the PF regeneration may be affected by unexpected changes in driving and traffic conditions. In one example, the detour may have a higher number of traffic signals compared to the expected route, and the frequent traffic stops may adversely affect PF regeneration. If it is determined that a detour is not taken, the scheduled PF regeneration may be continued and at 226, and the routine includes determining if the expected destination is reached. If it is determined that the expected destination has not been reached, at 224, the scheduled PF regeneration may be continued.

Once it is confirmed that the destination is reached, at 228, the soot loading on the PF may be estimated via the exhaust pressure sensor and the data may be updated. By estimating the remaining soot level in the PF, it is possible to estimate how much soot has been burnt during the regeneration process. Based on the level of soot removal during the drive cycle, it is possible to estimate the PF regeneration level achieved during travel along this route, as well as the probability of a PF regeneration process being terminated during travel along this route.

At 230, the route database may be updated with information including fuel consumption during travel along this route, time of travel (duration), traffic information, PF regeneration schedule, level of PF regeneration achieved, and the states of mind of the driver including conditions triggering a change in state of mind. An example method of updating the database after each trip is elaborated with reference to FIG. 4.

Returning to 208, if it is determined that a destination is not provided by the driver, the routine proceeds to 232 to predict a possible destination based on driver history as stored in the database. As an example, the prediction may be carried out while taking into account the current vehicle location, frequently travelled routes during the particular time of the day and the day of the week, and a driver state of mind. Traffic conditions (such as traffic congestion) and weather conditions (such as rain or snow forecast) in the neighborhood of the current vehicle location may also be taken into account while predicting the destination. In one example, the prediction may be carried out in increments during the trip. The vehicle controller may divide the route into route segments and predict an expected destination for an initial route segment. Greedy algorithm may be used by taking optimal path segments to predict intermediate points on the way to a destination.

If at 222 it is determined that a detour has been taken and the vehicle is no longer travelling to the expected destination via the expected route (as selected in step 216), the routine may also proceed to step 232 where a final destination or intermediate points may be predicted based on information available in the database. At 234, based on the predicted destination (or the upcoming intermediate point), the controller may use stochastic dynamic programming to update the one or more routes selected for reaching the predicted destination. The selection process may follow the algorithm as shown in step 212 using equation 1. Once the total cost functions are estimated for the plurality of routes between the current location of the vehicle and the predicted destination, the routes may be ranked based on the cost function, the highest ranked route corresponding to the lowest total cost function. When a PF regeneration is desired during the upcoming segment of the trip, a route with the highest expected PF regeneration level and lowest probability of termination of the regeneration event may be the highest recommended route. Once the one or more routes have been updated and ranked, the routine proceed to step 214 wherein the selected routes may be displayed to the driver in order of their ranks. At 216, if any of the recommended routes are not accepted by the driver, at 236, the controller may predict the route based on driver preference (corresponding to a driver state of mind), current traffic, and weather conditions at the current location and at the destination. As an example, the driver may prefer to take a certain route during a sunny day during weekday mornings. In another example, intermediate route segments may be predicted based on driver history as retrieved from the database. The controller may then schedule a PF regeneration event based on the predicted route segment.

In this way, in response to a destination for a drive cycle not being indicated by a driver, a current location of the vehicle may be determined, a driving history of the driver may be retrieved, a destination may be predicted based on the driving history, selection of one or more upcoming route segments may be dynamically updated based on the current location of the vehicle relative to the predicted destination, the route segments may be ranked based on each of a particulate filter regeneration efficiency, fuel efficiency, and time of travel, and displayed to the driver, the one or more route segments to the predicted destination displayed in order of their rank.

Figure 3:
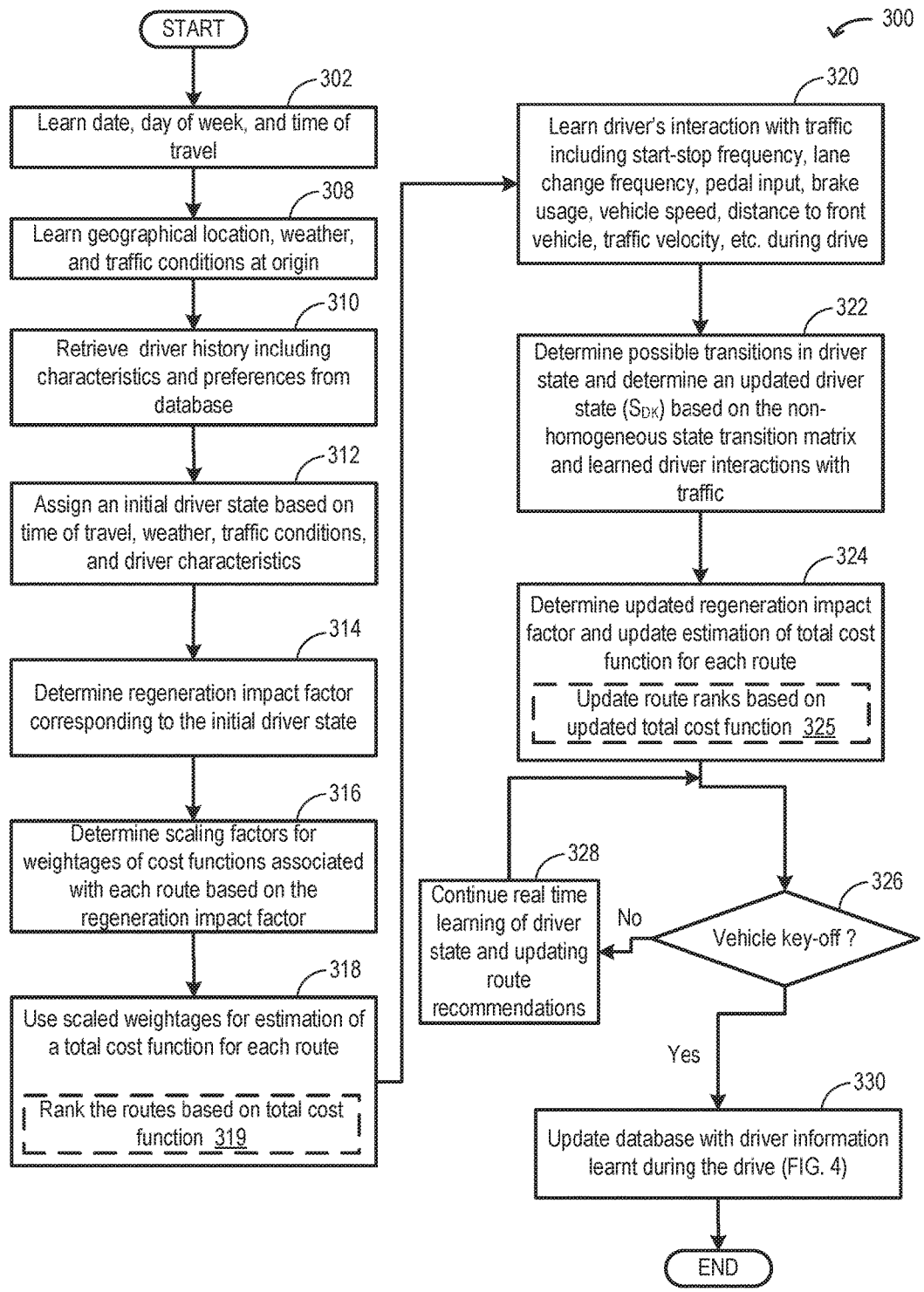
FIG. 3 shows flow chart illustrating an example method that may be implemented for determining a current state of mind of a driver and the influence of the driver state of mind upon route selection.

FIG. 3 shows an example method 300 for a real-time estimation of a state of mind of a driver and the influence of the driver state of mind upon route selection for a trip. The method 300 may be a part of the method 200 and may be carried out at step 212 of method 200. The route selection may be further based on the soot load accumulated on the particulate filter (PF).

At 302, the controller may learn a date of travel, the time of travel including a time of day when the vehicle is travelling, which day of the week the vehicle is travelling, etc. The controller may learn this information from an on-board navigation system (e.g., GPS device) or from a network cloud via a wireless connection. At 308, the controller may learn origin characteristics including the geographic location, current weather conditions, and traffic conditions. For example, based on information from the vehicle navigation system or the network cloud, the controller may determine the origin characteristics. In one example, the geographical location of the origin may include the GPS co-ordinates of the origin. The weather conditions may include temperature, humidity, wind speed, and precipitation (such as rain, snow, etc.). The traffic conditions may include speed limit of the road the vehicle is being operated, the velocity of overall traffic movement, average distance between vehicles, traffic congestions, etc. Also, the controller may learn the geographic location of the destination based on the driver's input to a navigation system.

At 310, driver history including driving characteristics of the driver may be retrieved from the database (such as database 13 in FIG. 1). In one example, a driver may be identified by the specific key used by the driver for operating the vehicle. In another example, a driver may be identified based on the time, day, date of travel and the geographical location of origin. As such, a particular driver (such as driver 1) may operate the vehicle during weekdays at a specific time (or time window) of the day while a different driver (such as driver 2) may operate the vehicle during weekends and during a certain time window. The characteristics of the driver may include frequency of brake usage, average acceleration force used, average lane change frequency, etc. The characteristics of the driver may vary based on the time, day, date of travel, weather, and the geographical location of origin. In one example, during a sunny day, the driver may drive more aggressively (such as frequent acceleration, increased lane changes, higher speed) compared to his driving style during rain. Further preferences of the driver, including frequently travelled routes, stops made during the travel, etc., may also be retrieved from the database. In one example, a driver may travel to a specific destination every weekday morning. If the driver leaves the origin at a certain time, the driver may typically make a stop on the way to the destination. However, if the driver leaves the origin at a later time, the driver may drive more aggressively to the same destination without making any stops. As such, the driver's time constraints may be different for different days of the week, such as, the driver may have a higher time constraint during weekdays compared to weekends. In another example, the driver's preferences may depend on weather conditions, such as the driver may take a different route than the frequently travelled route (while traveling from the origin to a frequently travelled destination) if it is snowing or if there is forecast for snow for example to avoid road segments that have a grade. In yet another example, the driver's preferences may depend on traffic conditions, the driver may take a different route than the frequently travelled route if there is traffic congestion at the origin. In a further example, the driver may select a route based on the fuel level, such as the driver may select a shorter route if the fuel level in the tank is lower than a threshold level. In a yet further example, the route selection may be based on the payload of the vehicle such as based on the number of passengers in the vehicle or if a trailer is being towed. The database is updated with information regarding the characteristics and preferences of the driver.

At 312, based on the retrieved information including driver history (characteristics of the driver and preferences of the driver), the day and time of travel, origin characteristics (weather conditions and traffic conditions), the controller may assign an initial state of mind to the driver. The state of mind of the driver may directly influence the driver's behavior (driving style) during the trip which may affect PF regeneration and the probability of termination of the regeneration. The states of mind are contextual and probabilistic and each driver may have a plurality of states of mind ($S_{DK}$, K=1, 2, 3, . . . , n) and each state may have a different effect on PF regeneration. In one example, a driver may have three distinct states of mind, a first state $S_{D0}$, a second state $S_{D1}$, and a third state $S_{D2}$. The first state of mind ($S_{D0}$) may correspond to an optimal state for PF regeneration. When the driver is operating in this optimal state of mind, the driving characteristics (such as frequency of brake usage, average acceleration force used, average lane change frequency, etc.) may facilitate PF regeneration and may not increase the probability of termination of the regeneration. For example, in the optimal state, the driver may operate the vehicle at a steady speed for longer durations while applying the brakes less frequently, the driver may not accelerate or decelerate within a short time, and may not change lanes frequently. In this optimal state of mind, passive regeneration of the PF may be carried out to a higher level enabling a more complete cleaning of the PF. The second driver state of mind ($S_{D1}$) may correspond to a sub-optimal state for PF regeneration where the regeneration level achieved is lower than the regeneration level achieved in the first state of mind. When the driver is operating in this sub-optimal state of mind, the driving characteristics (such as frequent accelerating and decelerating, changing lanes, making stops) may reduce the PF regeneration level and/or may increase the probability of early termination of the regeneration. The third driver state of mind ($S_{D2}$) may correspond to a least-optimal state for PF regeneration where the regeneration level achieved is lower than the regeneration levels achieved in each of the first state of mind and the second state of mind. When the driver is operating in this least-optimal state of mind, the driving characteristics (such as frequent braking, travelling at a lower speed) may further lower the PF regeneration level and/or may further increase the probability of early termination of the regeneration. In this least-optimal state, passive regeneration of the PF may be frequently interrupted and regeneration may not be carried out to a desired level.

Since the driver state of mind influences the PF regeneration, a regeneration impact factor may be correlated with each driver state of mind. At 314, an initial regeneration impact factor corresponding to the initial state of mind may be determined. In one example, the controller may use a look-up table to determine the initial regeneration impact factor corresponding to the initial driver state, with input being the initial driver state of mind and the output being the regeneration impact factor. FIG. 8 shows an example table 800 of regeneration input factors corresponding to each state of mind. The first row 802 shows a first regeneration impact factor $f_0$ corresponding the optimal state of mind ($S_{D0}$). The second row 804 shows a second regeneration impact factor $f_1$ corresponding the sub-optimal state of mind ($S_{D1}$). The first row 806 shows a third regeneration impact factor $f_2$ corresponding the least-optimal state of mind ($S_{D2}$).

At 316, a first set of scaling factors corresponding to the initial regeneration impact factor may be determined. Each regeneration impact factor may have a corresponding set of scaling factors that may be applied to weightages used for cost function calculation for each route between an origin and a destination. As shown in step 212 of FIG. 2, based on a PF regeneration requirement, one or more routes may be selected from the database for travel between the current vehicle position and the destination. A dynamic programming may be carried out to estimate the total cost associated with each route of the one or more selected routes. As an example, the total cost function associated with a route may be estimated by Equation 1. The total cost function associated with a particular route between an origin and a destination may be a summation of individual cost functions corresponding to each of an expected PF regeneration level of this route from origin to destination, probability of a PF regeneration process to be terminated during the drive cycle, cost to heat the PF to a temperature at which regeneration may commence, fuel consumption, and duration of the trip between the origin and destination. Weightages corresponding to individual cost functions may be adjusted based on the scaling factors corresponding to a regeneration impact factor. In one example, a scaling factor may be multiplied to the corresponding weightage of a cost function to determine a scaled weightage.

FIG. 9 shows a table 900 of scaling factors corresponding to regeneration impact factors and cost function weightages. The first column 902 of table 900 lists weightages associated with individual cost components of the total cost function for a route between an origin and a destination. The second column 904 lists the individual cost functions. The first weightage $w_1$ may be associated with the expected PF regeneration level of a route, the second weightage $w_2$ may be associated with cost to heat the PF to a temperature at which regeneration may commence, the third weightage $w_3$ may be associated with fuel consumption, the fourth weightage $w_4$ may be associated with time duration, and the fifth weightage $w_5$ may be associated with probability of a PF regeneration process to be terminated during travel in the route.

The third column 906 of the table shows the first set of scaling factors corresponding to the first regeneration impact factor ($f_0$) for each weightage. For the first regeneration impact factor ($f_0$), equal scaling factors of 0.2 may be assigned to each of the weightages $w_1$ to $w_5$. Since the scaling factors are equal for all the weightages and the sum of the scaling factors is maintained at 1, it may be inferred that the first regeneration impact factor ($f_0$) may not have any significant effect on the individual cost functions and the total cost function of any route. In other words, for the first regeneration impact factor ($f_0$), the operator may not enforce any specific trip criteria as critical and therefore costs associated with all the trip parameters may be weighted equally. The fourth column 908 of the table shows the second set of scaling factors corresponding to the second regeneration impact factor ($f_1$) for each weightage. For the second regeneration impact factor ($f_1$), the scaling factors may be unequally distributed while maintaining the sum of the scaling factors at 1. The scaling factors assigned to each of $w_1$ (PF regeneration level), $w_2$ (cost of regeneration), and $w_5$ (probability of regeneration termination) may be 0.25 while the scaling factors assigned to each of $w_3$ (fuel consumption) and $w_4$ (trip duration) may be 0.125. By assigning a higher scaling factor to each of $w_1$, $w_2$, and $w_5$, the individual costs associated with PF regeneration efficiency of the route may be increased relative to the individual cost functions relating to other factors such as time of travel and fuel usage. Based on the increase in the cost functions associated with PF regeneration efficiency of the route, it may be inferred that the second regeneration impact factor ($f_1$) may adversely affect the PF regeneration efficiency for the route if a regeneration is attempted.

The fifth column 910 of the table shows the third set of scaling factors corresponding to the third regeneration impact factor ($f_2$) for each weightage. For the third regeneration impact factor ($f_2$), the scaling factors may be unequally distributed while maintaining the sum of the scaling factors to be 1. The scaling factor assigned to $w_1$ (PF regeneration level) may be 0.35, the scaling factor associated with $w_2$ (cost of regeneration) may be 0.15, and the scaling factor associated with $w_5$ (probability of regeneration termination) may be 0.5 while the scaling factors assigned to each of $w_3$ (fuel consumption) and $w_4$ (trip duration) may be 0. By assigning a zero scaling factor to trip duration and fuel consumption and increasing the scaling factors for $w_1$, $w_2$, and $w_5$, the individual cost functions associated with PF regeneration efficiency of the route may be further increased while the individual cost functions relating to time of travel and fuel usage may not be accounted for in the total cost function estimation. The third regeneration impact factor ($f_2$) may significantly affect the PF regeneration efficiency for the route as probability of regeneration termination is higher and the total cost function for the route is calculated completely based on the PF regeneration efficiency thereby increasing the trip cost of a regeneration is attempted under these conditions.

At 318, the weightages scaled by the first set of scaling factors corresponding to the initial regeneration impact factor may be used to estimate a total cost function associated with each route between the origin and a destination, as selected from the database. Estimation of a total cost function based on individual cost functions associated with expected PF regeneration level of a route, probability of a PF regeneration process to be terminated during the drive cycle, cost to heat the PF to the regenerating temperature, fuel consumption, and duration of the trip may be carried out using Equation 1. A plurality of routes between the origin and the destination may be selected from the database and the total cost function may be estimated for each of the plurality of routes. The details of total cost function estimation is described in step 212 of FIG. 2.

Once the total cost functions are estimated for the plurality of available routes between the origin and the destination, the routes may be ranked based on the total cost function, the highest ranked route corresponding to the lowest total cost function. In one example, when a PF regeneration is desired during the upcoming drive cycle, such as when the PF soot level is higher than a threshold, a route with the highest expected PF regeneration level and lowest probability of termination of the regeneration event may be ranked highest. The highest ranked (recommended) route may be a route that enables the destination to be reached without any significant delay while providing the highest degree of regeneration and some degree of fuel economy. The subsequent route may provide a relatively lower degree of regeneration while still providing some degree of fuel economy, and so on. Once the one or more routes have been selected from the database and ranked, the selected routes may be displayed in the order of their ranks to the driver. The screen and user interface of the on-board navigation system may be used to display the selected routes to the operator.

Turning briefly to FIG. 5A, it shows a screenshot 500 of an example on-board navigation system displaying the ranked route options. In this example, PF regeneration is desired during the current drive cycle and therefore a route with the highest expected PF regeneration level and lowest probability of termination of the regeneration event may be ranked first. Further, in this example, the driver state of mind may be the optimal, first state ($S_{D0}$) and therefore there may not be a significant (detrimental) influence of the driver state of mind in the route rankings. Four routes have been selected from the database and ranked in order of their expected PF regeneration level in rows 502, 504, 506, and 508, respectively. In each column, a first box 501 indicates the suggested route between the origin and the destination, a second box 503 shows a PF regeneration percentage achievable during the drive, and a third box 505 shows the time required to reach the destination from the origin. The driver may select one of the four routes via a fourth box included in each row. The driver may select the fourth box of any one of the four routes via a user interface such as a touch function on the screen.

The first route, as shown in row 502, corresponds to the highest expected PF regeneration level but the trip duration is the longest. The fourth route, as shown in row 508, corresponds to the lowest expected PF regeneration level but the trip duration is the shortest. Each of the second route, as shown in row 504, and the third route, as shown in row 506, correspond to intermediate levels of expected PF regeneration level and trip duration. In this example, the driver selects the first route (row 502) corresponding to the highest expected PF regeneration. Based on the selection made by the driver, it may be inferred that the driver is not under a time constraint during this drive cycle and it is possible to schedule PF regeneration during the drive cycle. If a detour is taken where the driver starts on the selected route but does not follow the selected route, as discussed below, the controller may consider the current driver preference of selecting a route that enables a higher degree of PF regeneration while predicting destination (based on driver history) and ranking routes.

Returning to FIG. 3, during the drive cycle, in order to determine a current state of mind of the driver, at 320, the driver's real-time interactions with traffic may be determined. The driver state of mind may vary from one state of mind to another based on the driver's interaction with traffic, and further based on environmental factors (such as weather), and behavioral factors (such as reaction to a certain situation). The controller may determine the number and frequency of stops made (start-stop frequency) and the duration of each stop. In one example, the driver may be traveling via a busy street with frequent traffic stops where the vehicle stops for multiple shorter durations. In another example, the driver may make fewer stops but of longer durations. With an increase in the number of stops, the probability of termination of a regeneration may increase. The driver's frequency, and force of application of each of the accelerator pedal and the brake pedal may also be determined. In one example, a driver may be lead footed and may accelerate and brake frequently. In another example, a driver may maintain a steady vehicle speed over a time period without hard accelerations and decelerations. Also, the overall traffic velocity (average speed at which other on-road vehicles are travelling) and the distance between two consecutive vehicles travelling in a lane may be determined. As such, during lower traffic velocities, if the distance between consecutive vehicles is smaller, there may be higher possibility that the driver needs to apply brakes more frequently. In contrast, during higher traffic velocities, and when the distance between consecutive vehicles is higher, the vehicle may travel at a steady speed for a longer duration.

At 322, the controller may determine possible transitions in driver state of mind (e.g. from the initial state $S_{D0}$ to a state $S_{DK}$) based on the learned driver interactions with traffic and further based on environmental factors and behavioral factors. In one example, the driver state of mind may not change during the entire drive cycle while in another example, the driver state of mind may frequently change from one state to another. A non-homogeneous state transition model may be used to determine a probability of transition from one state of mind to another. In one example, a simplified homogeneous transition matrix (T) may be used to predict possible transitions from one state of mind to another.

An example of a homogeneous transition matrix (T) 700 is shown in FIG. 7. In the homogeneous transition matrix (T), a finite probability is assigned to each transition from one state to another. The probabilities may be based on driver history (as retrieved from the database) for state of mind transitions while operating on the same route. The finite probabilities in the homogeneous transition matrix may not change based on driver behavior (driver interactions with traffic) or conditions such as weather in the current drive cycle.

As seen from the matrix 700, the first row 702 denotes the probabilities of transition from a current state of mind of $S_{D0}$ to the states $S_{D1}$ and $S_{D2}$. If the current state is assigned to be $S_{D0}$, the chance that the driver will remain in the $S_{D0}$ state during the entire drive cycle is 70%, while the chance that the drive may transition to the state $S_{D1}$ at any point during the drive cycle is 20%, and the chance that the drive may transition to the state $S_{D2}$ directly from state $S_{D0}$, at any point during the drive cycle, is 10%. The second row 704 denotes the probabilities of transition from a current state of mind of $S_{D1}$ to the states $S_{D0}$ and $S_{D2}$. If the current state is assigned to be $S_{D1}$, the chance that the driver will remain in the $S_{D1}$ state during the entire drive cycle is 50%, while the chance that the drive may transition to the state $S_{D0}$ at any point during the drive cycle is 25%, and the chance that the drive may transition to the state $S_{D2}$ at any point during the drive cycle is 25%. The third row 706 denotes the probabilities of transition from a current state of mind of $S_{D2}$ to the states $S_{D0}$ and $S_{D1}$. If the current state is assigned to be $S_{D2}$, the chance that the driver will remain in the $S_{D2}$ state during the entire drive cycle is 50%, while the chance that the drive may directly transition to the state $S_{D0}$ at any point during the drive cycle is 25%, and the chance that the drive may transition to the state $S_{D1}$ at any point during the drive cycle is 25%.

The transition from one driver state of mind to another may be estimated based on a dynamic equation. For example, if the driver is in an initial mental state $S_{D0}$, the transition to a state $S_{Dk}$ may be estimated using equation 2.

$$S_{Dk}(t+n)=S_{Dk}*T^n \qquad (2)$$

where $S_{Dk}$ is a state of mind of a driver, t is time, n is the number of possible driver states of mind, and T is the homogeneous transition matrix.

In another example, a non-homogeneous transition matrix (Tn) may be used to predict possible transitions from one state of mind to another. The non-homogenous matrix may take into account real-time driver interactions with traffic, and other evolutionary conditions such as weather while determining a transition in state from an initial driver state to an updated driver state of mind. A non-homogeneous transition model may be experimentally identified and validated via tools including machine learning and exploratory data analysis. Such tools may be used to determine probabilities of transition from one state to another. The probabilities of transition for the non-homogeneous transition matrix (Tn) may not be definite numbers and may change in real-time. In one example, the probability of transition from an initial state ($S_{Dj}$) to an updated state ($S_{Dk}$), as shown in equation 3, may be a function of the driver interactions with traffic, weather conditions, driver trip constraints, and time of day.

$$P(S_{Dk}|S_{Dj})=f \text{ (driver interactions with traffic, weather, trip constraints, time of day)} \quad (3)$$

FIG. 6 shows a state machine diagram 600 for transition of a driver mental state from one state to another. In the diagram 600, three possible driver states of mind, $S_{D0}$, $S_{D1}$, and $S_{D2}$, are shown. In one example, if it is determined (based on driver history) that an initial driver state of mind is the first state $S_{D0}$, the driver may continue to operate in the first state of mind throughout the drive cycle. The first drive state of mind $S_{D0}$ is optimal for attaining increased PF regeneration efficiency. As such, in the first state, the driver may maintain a steady vehicle speed over a time period without hard accelerations and decelerations. The driver may continue to operate in the first state if there is no significant change in weather conditions and/or traffic conditions that may impose constraints and increase the duration of the trip. The probability that the driver will remain in the first state of mind is given by $P(S_{D0}|S_{D0})$.

The state of mind may transition from the first state $S_{D0}$ to the second state $S_{D1}$ in response to changes in driver interactions with traffic and/or weather. The second state $S_{D2}$ may be a sub-optimal state of mind and may have an adverse effect on PF regeneration efficiency. In one example, due to a change in weather, such as if it starts raining heavily during the drive, there may be changes in driver interactions with traffic. As such, the driver may accelerate within a short time and then frequently apply the brake to control the speed. Frequent application of brake may be detrimental to PF regeneration efficiency. In another example, an expected traffic congestion may cause the driver to stop for longer than anticipated, and after passing through the traffic congestion, the driver may drive aggressively to reach the destination without further delay. The probability of transition from the first state to the second state is given by $P(S_{D1}|S_{D0})$. Once in the second state, the driver may continue to operate in the second state for the remaining portion of the drive cycle. The probability that the driver will remain in the second state of mind is given by $P(S_{D1}|S_{D1})$. After operating in the second state for some time, the driver may transition to the first state $S_{D0}$ in response to changes in driver interactions with traffic and/or weather. In one example, due to changes in traffic conditions, such as fewer number of cars on the road, the driver may start driving less aggressively and there may be a consequent change in state of mind.

The driver state of mind may also transition from the second state $S_{D2}$ to the third state $S_{D2}$ in response to changes in driver interactions with traffic and/or weather conditions. The third state $S_{D3}$ may be the least optimal state of mind and may adversely affect PF regeneration efficiency. In one example, due to a further changes in weather, such as if it starts snowing during the drive, the driver may be making frequent stops without significantly accelerating. In another example, triggers such as a phone call may cause the driver to start driving aggressively with increased braking frequency. The probability of transition from the second state to the third state is given by $P(S_{D2}|S_{D1})$. Once in the third state, the driver may continue to operate in the third state for the remaining portion of the drive cycle. The probability that the driver will remain in the third state of mind is given by $P(S_{D3}|S_{D3})$. After operating in the third state for some time, the driver may transition to the second state $S_{D1}$ in response to changes in driver interactions with traffic and/or weather. In one example, the weather conditions affecting the driver interactions with traffic may change and the driver may make fewer stops in the drive cycle. The probability of transition from the third state to the second state is given by $P(S_{D1}|S_{D2})$. The state of mind may also transition from the third state directly to the first state facilitating improved PF regeneration. In one example, a road blockage may be lifted such that the driver is able to optimally accelerate without frequent braking during the remaining portion of the drive cycle. The probability of transition from the third state to the first state is given by $P(S_{D0}|S_{D2})$. As such, unexpected changes in traffic situation, such as a road closure, may lead to a transition from the first state to the third state. Due to the unexpected changes in traffic, the driver may take an alternate route and the driving aggressiveness may also increase. A change of state from the first to the third state may result in termination of an ongoing PF regeneration. The probability of transition from the first state to the third state is given by $P(S_{D2}|S_{D1})$. In this way, during the drive cycle, driver interactions with traffic, and environmental conditions may cause changes in the driver state of mind.

Based on the learned driver interactions with traffic, during the drive cycle, the controller may determine an updated driver state of mind. The controller may use the non-homogeneous transition model to determine the updated (current) driver state of mind. As such, there may be plurality of changes in the driver state of mind (there may be additional sates of mind, not depicted here) during the drive cycle, and the controller may continuously update the current driver state of mind as described above based on changes in operating conditions.

Returning to 324, the controller may determine an updated regeneration impact factor corresponding to the updated driver state of mind. In one example, the controller may use a look-up table to determine the updated regeneration impact factor corresponding to the updated driver state of mind, with input being the updated driver state of mind and the output being the updated regeneration impact factor. A second set of scaling factors may be associated with the updated regeneration impact factor. The total cost function of each route ranked and displayed before the change in the driver state of mind may be re-estimated based on changes in the weightages due to the scaling by the second set of scaling factors. Also, in response to the updated driver state of mind, new routes may be retrieved from the database and ranked along with the previously displayed routes. Alternatively, the previously displayed routes may be re-ranked and displayed in a different order. Weightages scaled by the second set of scaling factors corresponding to the updated regeneration impact factor may be used to estimate a total cost function associated with each of the routes. Estimation of a total cost function based on individual cost functions associated with expected PF regeneration level of a route, probability of a PF regeneration process to be terminated during the drive cycle, cost to heat the PF to the regenerating temperature, fuel consumption, and duration of the trip may be carried out using Equation 1. The details of total cost function estimation is described in step 212 of FIG. 2.

Once the total cost functions are estimated for the plurality of available routes between the origin and the destination, the routes may be re-ranked based on the total cost function, the highest ranked route corresponding to the lowest total cost function. In one example, the ranking of the routes may change following the update in the driver state of mind. In another example, the ranking of the routes may not change following the update in the driver state of mind. At 325, the updated ranking of the routes as estimated based on the updated total cost functions may be displayed to the driver.

FIG. 5B shows a screenshot 550 of an example on-board navigation system, wherein updated route options are displayed after a change in the driver state of mind. At the onset of the drive cycle, based on the initial driver state of mind, the routes selected between the origin and the destination were ranked and displayed as shown in FIG. 5A. After selecting the first route (from the displayed routes) corresponding to the highest degree of attainable PF regeneration, the driver may proceed along the selected route. However, after operating in the selected first route for a duration, there may be change in driver state of mind due to changes in traffic and/or environmental situations and based on the updated driver state of mind, the previously highest ranked route may no longer remain the route corresponding to the highest degree of attainable PF regeneration. In one example, the change in driver state of mind may be associated with the driver starting to drive more aggressively due to the presence of more traffic. Accordingly, the updated routes may include alternate routes with fewer vehicles that is more suited to steady state operation and achievement of the desired level of PF regeneration.

As seen in screenshot 550, in each row, a first box 501 indicates the suggested route between the origin and the destination, a second box 503 shows a PF regeneration percentage achievable during the drive, and a third box 505 shows the time required to reach the destination from the origin. The driver may select one of the four routes via a fourth box included in each row.

As such, previously displayed routes may be displayed once again but the ranking of the route may change. In one example, the route having the second rank in FIG. 5A may now be displayed as the highest ranked route in FIG. 5B while the route displayed as the highest ranked route in FIG. 5A may be displayed as the second ranked route in FIG. 5B. The route displayed as the third ranked route in FIG. 5A may no longer be displayed as a route option. The route displayed as the fourth ranked route in FIG. 5A may be displayed as the third ranked route in FIG. 5B while a new route between the current geographical location and the destination may be retrieved form the database and included as a new (fourth ranked) option. In this example, the driver may select the first route corresponding to the highest degree of attainable PF regeneration. Since the first route in the updated list is different from the previously selected route, updated navigation instructions may be provided to divert the driver from the current route. The driver may continue to drive along the newly selected route to the destination. In this way, the ranking of the routes may be updated in real-time based on a current driver state of mind and the updated rankings may be displayed to the driver. Similar updates in the recommended list of routes may occur multiple times during the drive cycle as the driver state of mind changes based on real-time conditions.

In this way, an updated driver state of mind and a corresponding regeneration factor may be selected from a database by applying a non-homogeneous transition model based on a probability of transitioning from a first driver state of mind (and corresponding first regeneration factor) to an updated driver state of mind (and corresponding updated, second regeneration factor), the probability based on real-time driver interactions with traffic.

Returning to FIG. 3, at 326, the routine includes determining if there is a key-off event indicating that the vehicle operation has stopped. If a key-off event is not indicated, at 328, the controller may continue to learn, in real-time, a current driver state of mind and based on the updated driver state of mind, route recommendations may be updated in real-time. Updating may include updating the ranking of previously displayed routes or displaying new routes (retrieved from the database) to the driver in order to increase the attainable level of PF regeneration during the given drive cycle.

At 330, the database may be updated with information learnt during the current drive cycle including the driver interactions with traffic, displayed routes, road segments traveled, different driver states of mind, actual particulate filter regeneration attained, etc. Further, the circumstances and probabilities of transition (from one state of mind to another) leading to each change in the driver state of mind may be included in the update. The details of updating the database with information learned during the current drive cycle is discussed in detail at FIG. 4.

In this way, at an onset of a drive cycle, a first particulate filter regeneration factor may be selected based on a past driving history of an operator, and one or more driving routes selected from a database may be displayed to the operator, the one or more routes ranked based on each of drive cycle origin and destination, respective regeneration completion efficiencies and the first regeneration factor. Navigational instructions for an operator selected route from the displayed one or more driving routes may be displayed to the operator. During the drive cycle, a second particulate filter regeneration factor may be selected based on real-time driver interactions with traffic while travelling along the operator selected route and accordingly route and navigational instructions may be updated.

Figure 4:
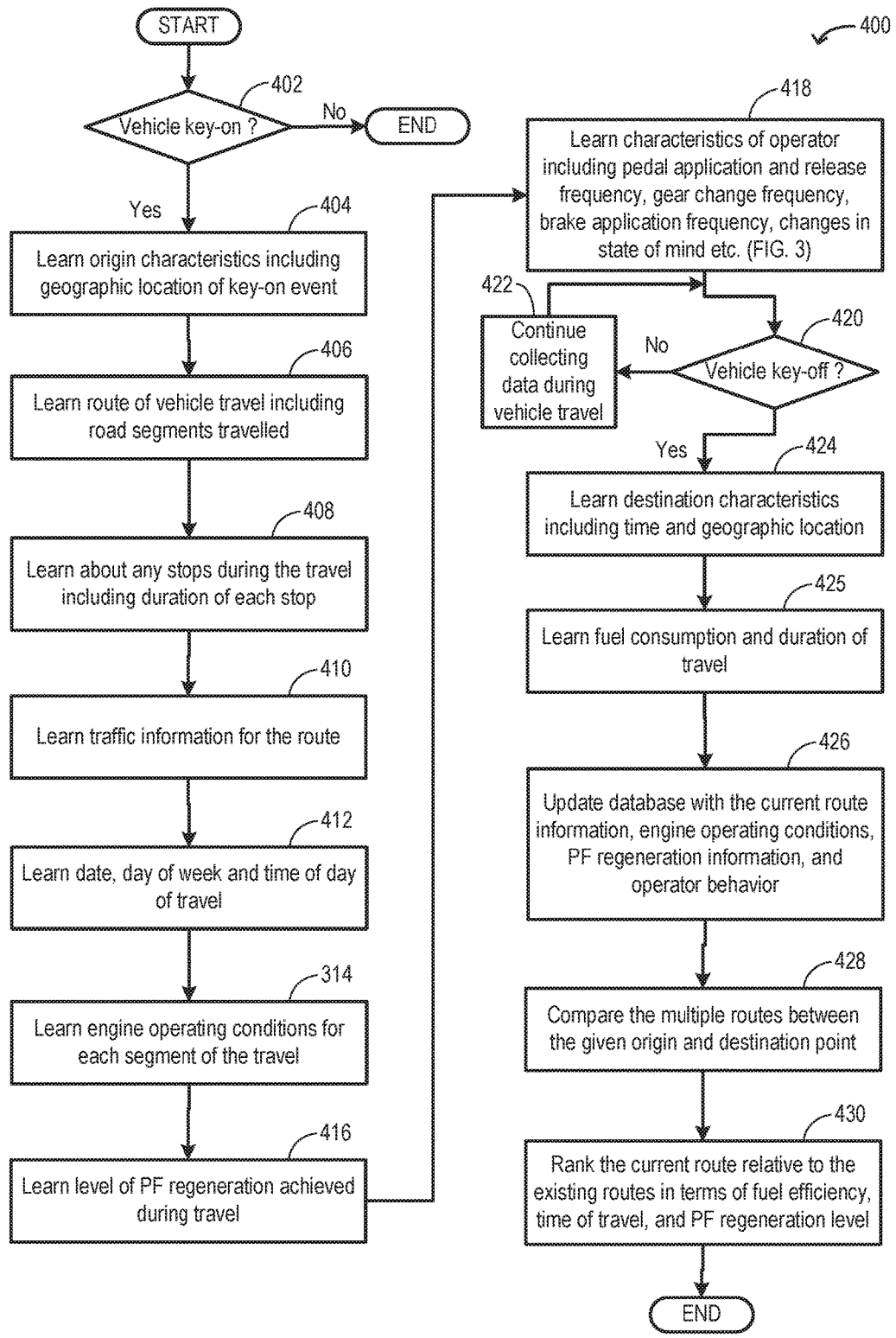
FIG. 4 shows a flow chart illustrating an example method that may be implemented for updating a database of frequently travelled routes.

FIG. 4 shows an example method 400 for updating the database of frequently travelled routes. At 402, the routine may include determining if there is a vehicle key-on event. For example, it may be determined if the vehicle driver has expressed an intent to start vehicle operation. As such, by confirming a vehicle key-on event, an upcoming vehicle drive cycle is indicated. If a vehicle key-on event is not detected, and therefore an upcoming vehicle drive cycle, is not confirmed, the method may end and the database may not be updated.

If the vehicle key-on event is confirmed, at 404, the controller may learn origin characteristics including time and geographic location of the key-on event. For example, based on information from a vehicle navigation system (e.g., GPS device), the controller may determine the origin characteristics. In this way, the controller may determine an amount of time the vehicle was stopped at a location (e.g., the point of origin) before beginning a trip. Also, a duration elapsed since the immediately preceding key-off event may be determined. That is, a stopped duration of the vehicle at the current location may be estimated.

At 406, the controller may learn details regarding a route of vehicle travel including road segments traveled. This may include topographical information (such as road gradient, incline, terrain) of each of the road segments in the actual route of travel. The details may be learned based on information from the vehicle navigation system and/or from an external server via wireless communication. At 408, the controller may learn details about intermediate stops on the way to the destination. The stops may be due to traffic signals, traffic congestions, or the stops may be intentionally made by the driver. The geographical location and also the duration of each of the stops may also be learned. At 410, traffic information for the route including the number of traffic stops may be learned via the navigation system. The controller may also determine the speed limits of each road segment and the actual speed of vehicle travel.

At 412, the controller may learn the time of travel including a time of day when the vehicle is travelling, a date of travel, which day of the week the vehicle is travelling, etc. At 414, the controller may learn engine operating conditions such as engine speed, engine load, engine temperature, etc., from a plurality of engine sensors (such as sensor 16 in FIG. 1) during each road segment travelled. Also, the controller may learn the soot level accumulated on the PF during the vehicle travel.

At 416, the controller may learn the level of PF regeneration achieved during the current travel. In one example, the level of PF regeneration may be determined based on the change in PF soot level (between soot level measured at the onset of the drive and at the end of each road segment) as estimated via an exhaust pressure sensor. In another example, the level of PF regeneration may be determined based on the duration of PF regeneration. Also, it may be learned if the PF regeneration process has been prematurely terminated due to unfavorable operating conditions during the drive cycle. The reasons for PF regeneration termination and the engine operating conditions and the road conditions at which the PF regeneration event was terminated may also be recorded.

At 418, the controller may learn the driving characteristics of the driver. These may include, for example, frequency of brake and accelerator pedal application, frequency of brake and accelerator pedal release, transmission gear change frequency, duration of operation in electric mode versus engine mode, etc. The controller may also learn the different states of mind of the driver and the duration of each state of mind, during the drive cycle based on the driving characteristics. Further, the conditions (traffic, environmental, behavioral, etc.) triggering the changes in driver state of mind may also be learned. Further, at each driver state of mind, the controller may learn the probabilities of transition from the current state of mind to another as a function of the current state of mind and the conditions triggering the change in the driver state of mind.

At 420, the routine includes determining if there is a key-off event indicating that the vehicle operation has stopped. If a key-off event is not indicated, at 422, the controller may continue collecting data regarding various aspects of vehicle operation during vehicle travel. If a vehicle stop is confirmed, at 424, the method includes learning destination characteristics including geographical location of the destination.

At 425, the controller may learn the fuel consumed during the trip from the origin to the destination. As an example, the amount of fuel consumed may be estimated based on the initial and the final fuel level in the fuel tank. In another example, fuel consumption may be estimated based on engine operating conditions. Also, the duration of travel, and the time taken to reach the destination from the origin may be learned.

At 426, the database may be updated with all the aforementioned data (as collected in steps 404 to 424) including information regarding current route of travel, engine operating conditions, PF regeneration information, and driver driving characteristics. At 428, the current route for travelling between the origin and the destination may be compared to one or more routes (between the origin and the destination) previously stored in the database. Cost function as estimated by Equation 1 may be estimated for the current route and compared to the cost function of each of the routes previously saved in the database. At 430, based on the cost function comparison, the different routes may be ranked in terms of highest fuel efficiency, shortest duration of travel, highest level of PF regeneration level achieved and any other operator selected cost function. Also, a Markov chain based route ranking algorithm may be used. As an example, a route in which the target level of PF regeneration may be possible but may not be the most fuel efficient route.

In this way, at vehicle key-off, the database may be updated with route information, origin characteristics, destination characteristics, driver behavior, level of PF regeneration achieved, engine operating conditions, date and time information, and traffic information, etc.

FIG. 10 shows a prophetic example of prediction and dynamic selection of a proposed route suitable for optimal particulate filter regeneration. A route may be selected from an existing route database based on PF regeneration requirements of the engine, and a current driver state of mind and the selected route may be displayed to the driver. The horizontal (x-axis) denotes time and the vertical markers t1-t6 identify significant times in the operation of the vehicle system.

At time t1, the driver starts the vehicle (such as a key-on event) and the current geographical location of the vehicle, as determined via an on-board navigation system, is denoted by A. The driver initially indicates, via an input to the navigation system, the geographical location of the destination as denoted by B. The controller retrieves drive history (for the driver) including characteristics and preferences of the driver (such as frequency of brake usage, average acceleration force used, average lane change frequency, etc.) from the database. The controller may determine the current day and time of travel, origin characteristics (weather conditions and traffic conditions), and based on the retrieved data (above mentioned information), the controller assigns an initial state of mind to the driver. The controller then selects one or more routes from the database using dynamic programming based on PF soot level, fuel consumption, time of travel, and traffic conditions. Line 1020 shows change in soot level deposited on the PF. Dotted line 1021 denotes a threshold above which PF regeneration is desired. Based on the current PF soot level (at time t1), the controller infers that PF soot level may increase to the threshold soot level during the trip from point A to point B and PF regeneration needs to be carried out. The controller then ranks the one or more selected routes as a weighted function of each of a particulate filter regeneration efficiency, a probability of completion of a PF regeneration event, a fuel efficiency, and a travel time. While ranking the one or more selected routes, the weighted function is adjusted based on a regeneration efficiency factor corresponding to the initial state of mind of the driver. In this example, the initial driver state of mind is an optimal state of mind ($S_{D0}$) wherein the particulate filter regeneration efficiency is highest and the probability of completion of a PF regeneration event is also elevated. The particulate filter regeneration efficiency is an amount of particulate filter regeneration achieved in the drive cycle via a combination of passive and active regeneration. In passive regeneration, the soot is burnt due to higher exhaust temperature during higher load conditions and during active regeneration, temperature of the PF may be increased by flowing electricity through it. In response to the upcoming requirement of PF regeneration, during ranking of the one or more routes, a higher weightage is assigned to each of the particulate filter regeneration efficiency and the probability of completion of a PF regeneration event and a lower weightage is assigned to fuel efficiency and travel time. In this way, the controller displays the route with the highest efficiency of particulate filter regeneration and probability of completion of a PF regeneration event at the highest ranked and the route with the lowest efficiency of particulate filter regeneration and probability of completion of a PF regeneration event at the lowest rank. The list is then displayed to the driver so that they can select a route based on the ranking.

At time t1, the driver selects route 402 which is the highest ranked route in the list of suggested routes between the origin A and destination B as provided to the driver. However, at time t2, it is observed that the driver deviates from the originally selected route and takes a new route. In response to the change in route, the controller predicts the upcoming route segments between the current location to the destination B based on the driver's driving history retrieved from the database and current traffic conditions. As such, the frequently travelled routes by the driver during the time and/or day of the week is taken into consideration while predicting the upcoming route segments using stochastic dynamic programming. Based on driver history and initial state of mind, the controller predicts that the driver may take route 404 to a first intermediate stop C and from there take route 406 to the destination B. The controller then schedules PF regeneration based on the predicted route.

The driver follows the predicted route and continues to drive via route 404, however it is observed that after the first intermediate stop C, at time t3, the driver deviates from route 406. Also, at time t3, based on driver interactions with traffic between time t1 and t3, the controller updates the state of mind of the driver from the optimal state of mind to a second, sub-optimal state of mind ($S_{D1}$). Due to the transition to the second, sub-optimal state of mind, it may be learnt that the driver may be operating the vehicle more aggressively and the driving characteristics, such as an increased frequency of brake application, may reduce the particulate filter regeneration efficiency and may decrease the probability of completion of a PF regeneration on the given drive cycle. In response to the change in route, based on driver history and the updated state of mind, once again the controller predicts that the driver may take route 408 to a second intermediate stop D and from there take route 410 to a third intermediate stop E and then take route 412 to the destination B. However, it is observed that the driver does not take the predicted route segments 408, 410, and 412 but continues to the destination via a new route 414 and 416. The driver makes a stop at an intermediate point F on the way to the destination B and finally reaches the destination at time t4.

It is observed that the soot level in the PF reaches the threshold level 421 at time t3, and passive regeneration of the soot is carried out. However, since the driver does not follow a suggested route optimal for PF regeneration and due to the sub-optimal state of mind of the driver, the level of PF regeneration achieved upon reaching the destination B at time t4 is lower than the level of PF regeneration that could have been achieved if the driver would have taken route 1002 from the origin A to the destination B. Also, due to the driver deviating from the suggested and the predicted routes, scheduling of passive regeneration of the PF (between time t3 and t4) may not have been possible. Dotted line 1022 shows a possible change in soot level in the PF that would have occurred if route 1002 was taken and assuming that the driver state of mind had not changed from the first to the second. As observed from the plots 1020 and 1022, the amount of soot burnt between time t3 and t4 would have been higher if suggested route 1002 was taken relative to the amount of soot burnt during travel via routes 1014 and 1016.

At time t4, upon reaching the destination B (at vehicle key-off) the database may be updated with route information, origin characteristics (such as geographic location), destination characteristics, location of each stop taken, driver interactions with traffic (such as frequency of gear change, pedal application and release frequency, brake application frequency, etc.), level of PF regeneration achieved, engine operating conditions (such as engine speed, engine load, engine temperature, etc.), date and time information, driver states of mind, and traffic information. Also, road gradient, terrain, incline information for each segment of the route may be included in the database. The data saved in the database may be utilized for future route selection and/or prediction.

In this way, by dynamically selecting a travel route, based on particulate filter regeneration requirement during a drive cycle, from a plurality of routes available in a database, PF regeneration may be effectively scheduled and carried out. By accounting for a current driver state of mind representative of real-time driver driving behavior, the likelihood that a driver will select a recommended route where PF regeneration efficiency is higher, is increased. By estimating the driver state of mind in real-time based on driver interactions with traffic, and environmental conditions, ranking of the navigational routes corresponding to the probability of attainment of a desired level of PF regeneration may be updated as driver behavior changes. By predicting a destination or segments of an upcoming route based on drive history and drive statistics stored in the route database, it may be possible to schedule PF regenerations even during trips where a final destination has not been specified by the driver or when the driver deviates from a selected route. The technical effect of maintaining a database of driver mental states and frequently traveled routes with information including the possible degree of PF regeneration attainable on each route is that at vehicle key-on, an initial state of mind may be selected from the database based on driver history and a route may be selected from the database based on the PF soot level and driver selected cost function including highest fuel efficiency and lowest travel time for the drive cycle. In this way, during higher than threshold PF soot load, by selecting a favorable route for opportunistically regenerating the PF, over-loading of soot in the PF may be reduced thereby improving engine performance. By allowing for a PF to be regenerated opportunistically, using passive regeneration, the need for active regeneration is reduced, providing additional fuel efficiency benefits.

An example engine method comprises: learning, after each drive cycle, a particulate filter regeneration efficiency as a function of one or more characteristics of a travelled route and operator behavior over the travelled route, updating a database based on the learning, and at onset of a drive cycle, displaying to an operator one or more routes selected from the database, the selection based on a particulate filter soot load at the onset of the drive cycle. In any preceding example, additionally or optionally, the selection is further based on an operator indicated destination for the drive cycle relative to an origin of the drive cycle. In any or all of the preceding examples, additionally or optionally, the selection is further based on an operator selected cost function including one or more of a highest fuel efficiency and a lowest travel time for the drive cycle. Any or all of the preceding examples further comprises, additionally or optionally, ranking the one or more routes as a weighted function of each of a particulate filter regeneration efficiency, a probability of completion of a particulate filter regeneration event, a fuel efficiency, and a travel time of each of the one or more routes. In any or all of the preceding examples, additionally or optionally, the particulate filter regeneration efficiency includes a degree of particulate filter regeneration predicted for the drive cycle, and wherein the one or more characteristics of the traveled route include a number of stops, a road gradient, and traffic conditions. In any or all of the preceding examples, additionally or optionally, each of the particulate filter regeneration efficiency and the probability of completion of a particulate filter regeneration event are assigned higher weightages when the particulate filter soot load is higher than a threshold. In any or all of the preceding examples, additionally or optionally, each of the fuel efficiency and the time of travel are assigned higher weightages when the particulate filter soot load is lower than the threshold. Any or all of the preceding examples further comprises, additionally or optionally, in response to the operator not selecting a route from the one or more routes displayed to the operator, dynamically predicting an upcoming route segment based on an operator driving history retrieved from the database. In any or all of the preceding examples, additionally or optionally, the operator driving history includes routes previously traveled as a function of one or more of time of day, day of a week, and traffic conditions. Any or all of the preceding examples further comprising, additionally or optionally, in response to the operator selecting a route from the one or more routes displayed to the operator, initiating travel along the route, and then deviating from the selected route, dynamically predicting an upcoming route segment based on an operator driving history retrieved from the database. Any or all of the preceding examples further comprising, additionally or optionally, based on the route selected by the operator from the one or more displayed routes, scheduling an active particulate filter regeneration event during the drive cycle, wherein during the active particulate filter regeneration event, a temperature of the particulate filter is increased by flowing electric current through the particulate filter. Any or all of the preceding examples further comprising, additionally or optionally, when a destination for the drive cycle is not specified by the operator, predicting the destination based on an operator driving history as retrieved from the database, and displaying to the operator, one or more routes selected from the database based on the predicted destination. In any or all of the preceding examples, additionally or optionally, the onset of the drive cycle includes a vehicle key-on event, and wherein updating the database based on the learning includes, at a vehicle key-off event, updating the database with route information, origin characteristics, destination characteristics, operator behavior, level of particulate filter regeneration achieved, engine operating conditions, date and time information, and traffic information.

Another example engine method comprises: in response to an operator destination selection indicated via a display of a vehicle, estimating an exhaust particulate filter soot load, determining a current location of the vehicle, retrieving one or more routes from the current location to the destination from a database, ranking the one or more routes based on each of a particulate filter regeneration efficiency, fuel efficiency, and time of travel of each route, and displaying to the operator the one or more routes to the selected destination in order of their rank. Any of the preceding examples further comprising, additionally or optionally, responsive to a higher than threshold particulate filter soot load, ranking the one or more routes by assigning a higher weightage to particulate filter regeneration efficiency and a lower weightage to each of the fuel efficiency and the time of travel. Any or all of the preceding examples further comprises, additionally or optionally, responsive to a lower than threshold particulate filter soot load, ranking the one or more routes by assigning the higher weightage to each of the fuel efficiency and the time of travel and assigning the lower weightage to the particulate filter regeneration efficiency. Any or all of the preceding examples further comprises, additionally or optionally, responsive to the operator not selecting a route from the one or more displayed routes or the operator deviating from a selected route, predicting one or more route segments from the current location to the destination based on operator drive history, retrieved from the database, and scheduling passive regeneration of the particulate filter based on the one or more predicted route segments.

In yet another example, a vehicle method comprises: in response to a destination for a drive cycle not being indicated by an operator, determining a current location of the vehicle, retrieving a driving history of the operator from a database, predicting a destination based on the driving history, dynamically updating selection of one or more upcoming route segments based on the current location of the vehicle relative to the predicted destination, ranking the one or more upcoming route segments based on each of a corresponding particulate filter regeneration efficiency, fuel efficiency, and time of travel, and displaying to the operator, the one or more upcoming route segments to the predicted destination, hierarchically in order of their rank. Any preceding example further comprising, additionally or optionally, in response to the operator not selecting a route from the one or more displayed upcoming route segments, dynamically updating the one or more upcoming route segments based on the driving history, and scheduling active regeneration of the particulate filter based on the updated one or more route segments. Any or all of the preceding examples further comprises, additionally or optionally, at completion of a drive cycle, updating the database with route segment information including operator behavior, level of particulate filter regeneration achieved, engine operating conditions over the completed drive cycle, date and time of travel information, and traffic information over the drive cycle.

In a further example, an engine method comprises: at an onset of a drive cycle, displaying a first driving route responsive to each of a particulate filter (PF) loading and past driving history; and during travel along the first driving route, displaying an updated route responsive to each of traffic conditions and a comparison of a real-time driving history along the first route on the drive cycle relative to the past driving history. In any preceding example, additionally or optionally, displaying the first driving route includes selecting the first driving route from a database, including a plurality of driving routes, based on a first inferred driver state of mind, the first inferred driver state of mind based on the past driving history, and wherein displaying the updated route includes selecting the updated route from the database based on an updated driver state of mind. In any or all of the preceding examples, additionally or optionally, the updated driver state of mind is selected from a plurality of inferred driver states of mind stored in the database, the updated driver state of mind selected based on a comparison of the real-time driving history along the first route on the drive cycle relative to the past driving history, wherein each of the plurality of inferred driver states of mind has an associated PF regeneration factor. In any or all of the preceding examples, additionally or optionally, displaying the first route further includes, responsive to an operator indicated destination for the drive cycle, displaying one or more routes retrieved from the plurality of driving routes included in the database, the one or more routes ranked as a first function of corresponding PF regeneration efficiency, a probability of completion of a PF regeneration event during the drive cycle, and a first PF regeneration factor associated with the first driver state of mind, wherein the corresponding PF regeneration efficiency for each of the one or more routes is determined as a function of the corresponding degree of PF regeneration predicted for the drive cycle and the first PF regeneration factor. In any or all of the preceding examples, additionally or optionally, displaying the updated route includes, responsive to the comparison, displaying the one or more routes, the one or more routes ranked as a second function of updated PF regeneration efficiency, the probability of completion of the PF regeneration event during the drive cycle, and a second PF regeneration factor associated with the updated driver state of mind, wherein the corresponding PF regeneration efficiency for each of the one or more routes is determined as a function of the corresponding degree of PF regeneration predicted for the drive cycle and the second PF regeneration factor. In any or all of the preceding examples, additionally or optionally, ranking the one or more routes as the function of the first PF regeneration factor includes ranking the one or more routes based on assigned weightages to each of the PF regeneration efficiency and the probability of completion of the PF regeneration event during the drive cycle, the assigned weightages scaled by a first function based on the first PF regeneration factor, and wherein ranking the one or more routes as the function of the updated PF regeneration factor includes ranking based on assigned weightages to each of the PF regeneration efficiency and the probability of completion of the PF regeneration event during the drive cycle, the assigned weightages scaled by a second set of factors corresponding to the second PF regeneration factor, the second set different from the first set. In any or all of the preceding examples, additionally or optionally, the real-time driving history includes real-time driver interactions with traffic including real-time accelerator pedal usage and real-time brake usage during the drive cycle while driving along the first driving route, and wherein the past driving history includes frequency of brake usage, average acceleration force used, and average lane change frequency while driving along the first route in one or more drive cycles prior to the drive cycle. Any or all of the preceding examples further comprises, additionally or optionally, learning, at completion of the drive cycle, a degree of PF regeneration attained during the drive cycle and then updating the database with the learned degree of PF regeneration attained for the drive cycle, the first inferred driver state of mind, and the updated driver state of mind.

In a yet further example, a method comprises: at an onset of a drive cycle, selecting a first particulate filter regeneration factor based on a past driving history of an operator; displaying, to the operator, one or more driving routes selected from a database, the one or more routes ranked based on each of drive cycle origin and destination, respective regeneration completion efficiencies and the first regeneration factor; displaying, to the operator, navigational instructions for an operator selected route from the displayed one or more driving routes; and during the drive cycle, selecting a second particulate filter regeneration factor based on real-time driver interactions with traffic while travelling along the operator selected route. In any preceding example, additionally or optionally, each of the first regeneration factor and the second regeneration factor are selected from a plurality of regeneration factors stored in the database, each of the plurality of regeneration factors corresponding to a distinct driver state of mind. In any or all of the preceding examples, additionally or optionally, selecting the second regeneration factor includes applying a non-homogeneous transition model to select the second regeneration factor from the plurality of regeneration factors based on a probability of transitioning from the first regeneration factor to the second regeneration factor, the probability based on the real-time driver interactions with traffic. In any or all of the preceding examples, additionally or optionally, the past driving history of the driver includes routes traveled by the operator as a function of one or more of a time of a day, the day of a week, the drive cycle origin and destination, and drive characteristics including frequency of brake usage, average acceleration force used, and average lane change frequency. In any or all of the preceding examples, additionally or optionally, the real-time driver interactions with traffic include one or more of frequency of stops, frequency of lane changes, accelerator pedal input, and brake input during the drive cycle. In any or all of the preceding examples, additionally or optionally, selecting the first regeneration factor is further based on traffic conditions at the drive cycle origin, and environmental conditions at the drive cycle origin including ambient temperature, ambient humidity, and precipitation. In any or all of the preceding examples, additionally or optionally, the one or more routes being ranked further includes ranking each of the one or more routes based on a weighted function of each of the respective regeneration completion efficiencies, a probability of completion of a particulate filter regeneration event, fuel efficiency, and a time to destination of each of the one or more routes, the weighted function scaled based on the first regeneration factor. Any or all of the preceding examples further comprises, additionally or optionally, in response to selection of the second particulate filter regeneration factor, updating the weighted function scaled based on the second regeneration factor, and then updating the ranking of the one or more routes.

In another further example, a vehicle system comprises: a vehicle, a navigation system wirelessly connected to an external network, a display, an engine including an intake system and an exhaust system, the exhaust system including a particulate filter (PF) coupled to an exhaust passage and a pressure sensor coupled to the exhaust passage upstream of the particulate filter, and a controller with computer readable instructions stored on non-transitory memory for: at an onset of a drive cycle, displaying a first route based on PF load and a first driver state of mind, and responsive to driver interactions with traffic while travelling on the first route, displaying a plurality of updated routes based on a second driver state of mind, wherein the first driver state of mind is selected from a database based on each of the PF load and a driver history and a change from the first driver state of mind to the second driver state of mind is based on the driver interactions with traffic while traveling on the first route. In any preceding example, additionally or optionally, the first route is selected based on a first weighted PF regeneration efficiency, the first weighted PF regeneration efficiency based on a first PF regeneration factor corresponding to the first driver state of mind. In any or all of the preceding examples, additionally or optionally, the plurality updated routes are selected based on a second weighted PF regeneration efficiency, the second weighted PF regeneration efficiency based on a second PF regeneration factor corresponding to the second driver state of mind, and wherein the displaying of plurality of the updated routes include ranking each route of plurality of the updated routes based on the second weighted PF regeneration efficiency. In any or all of the preceding examples, additionally or optionally, the controller contains further instructions for: learning, during the drive cycle, the driver interactions with traffic, displayed routes, road segments traveled, driver state of mind, particulate filter regeneration attained, and after completion of the drive cycle, updating the database based on the learning.

In a further representation, the vehicle is a hybrid vehicle system. In any preceding example, additionally or optionally, an example method for a hybrid vehicle comprises: at an onset of a drive cycle, selecting a first value indicative of a driver state of mind based on a drive history, displaying, to the driver, one or more routes selected from a database, a regeneration factor of each of the one or more routes based on the first value, and during the drive cycle, selecting, in real-time, a second value indicative of an updated driver state of mind based on real-time driver interactions with traffic.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
   learning, via an electronic controller, after a drive cycle, a particulate filter regeneration efficiency as a function of characteristics of a travelled route and operator behavior over the travelled route;
   updating routes of a database, via the controller, based on the learning; and
   at onset of a subsequent drive cycle, displaying to an operator one or more routes selected from the database, the selection based on a particulate filter soot load at the onset of the subsequent drive cycle.

2. The method of claim 1, wherein the selection is further based on an operator indicated destination for the drive cycle relative to an origin of the drive cycle.

3. The method of claim 1, wherein the selection is further based on an operator selected cost function including one or more of a highest fuel efficiency and a lowest travel time for the drive cycle.

4. The method of claim 1, further comprising, ranking the one or more routes as a weighted function of each of a particulate filter regeneration efficiency, a probability of completion of a particulate filter regeneration event, a fuel efficiency, and a travel time of each of the one or more routes.

5. The method of claim 4, wherein the particulate filter regeneration efficiency includes a degree of particulate filter regeneration predicted for the drive cycle, and wherein one or more characteristics of the traveled route include a number of stops, a road gradient, and traffic conditions.

6. The method of claim 4, wherein each of the particulate filter regeneration efficiency and the probability of completion of the particulate filter regeneration event are assigned higher weightages when the particulate filter soot load is higher than a threshold.

7. The method of claim 6, wherein each of the fuel efficiency and the travel time are assigned higher weightages when the particulate filter soot load is lower than the threshold.

8. The method of claim 1, further comprising, in response to the operator not selecting a route from the one or more routes displayed to the operator, dynamically predicting an upcoming route segment based on an operator driving history retrieved from the database.

9. The method of claim 8, wherein the operator driving history includes routes previously traveled as a function of one or more of time of day, day of week, and traffic conditions.

10. The method of claim 1, further comprising, in response to the operator selecting a route from the one or more routes displayed to the operator, and initiating travel along the selected route, but then deviating from the selected route, dynamically predicting an upcoming route segment based on an operator driving history retrieved from the database.

11. The method of claim 10, further comprising, based on the route selected by the operator from the one or more displayed routes, scheduling an active particulate filter regeneration event during the drive cycle, wherein during the active particulate filter regeneration event, a temperature of the particulate filter is increased by flowing electric current through the particulate filter.

12. The method of claim 1, further comprising, when a destination for the drive cycle is not specified by the operator, predicting the destination based on an operator driving history as retrieved from the database and displaying to the operator one or more routes selected from the database based on the predicted destination.

13. The method of claim 1, wherein the onset of the drive cycle includes a vehicle key-on event, and wherein updating the database based on the learning includes, at a vehicle key-off event, updating the database with route information, origin characteristics, destination characteristics, operator behavior, level of particulate filter regeneration achieved, engine operating conditions, date and time information, and traffic information.

14. An engine method, comprising:
in response to an operator destination selection indicated via a display of a vehicle;
estimating an exhaust particulate filter soot load via an exhaust pressure sensor;
determining a current location of the vehicle via a navigation system;
retrieving one or more routes from the current location to a destination from a database via an electronic controller;
ranking, via the controller, the one or more routes based on each of a particulate filter regeneration efficiency, fuel efficiency, and time of travel of each route; and
displaying to the operator, via a user interface, the one or more routes to the selected destination in order of their rank.

15. The method of claim 14, further comprising, responsive to a higher than threshold particulate filter soot load, ranking the one or more routes by assigning a higher weightage to particulate filter regeneration efficiency and a lower weightage to each of the fuel efficiency and the time of travel.

16. The method of claim 15, further comprising, responsive to a lower than threshold particulate filter soot load, ranking the one or more routes by assigning the higher weightage to each of the fuel efficiency and the time of travel and assigning the lower weightage to the particulate filter regeneration efficiency.

17. The method of claim 14, further comprising, responsive to the operator not selecting a route from the one or more displayed routes or the operator deviating from a selected route, predicting one or more route segments from the current location to the destination based on operator drive history, retrieved from the database, and scheduling passive regeneration of the particulate filter based on the one or more predicted route segments.

18. A vehicle method, comprising:
in response to a destination for a drive cycle not being indicated by an operator;
determining a current location of a vehicle via a navigation system;
retrieving a driving history of the operator from a database via an electronic controller;
predicting a destination based on the driving history via the controller;
dynamically updating selection of one or more upcoming route segments based on the current location of the vehicle relative to the predicted destination via the controller;
ranking, via the controller, the one or more upcoming route segments based on each of a corresponding particulate filter regeneration efficiency, a fuel efficiency, and a time of travel; and
displaying to the operator, via a user interface, the one or more upcoming route segments to the predicted destination, hierarchically in order of their rank.

19. The method of claim 18, further comprising, in response to the operator not selecting a route from the one or more displayed upcoming route segments, dynamically updating the one or more upcoming route segments based on the driving history and scheduling active regeneration of the particulate filter based on the updated one or more route segments.

20. The method of claim 18, further comprising, at completion of a drive cycle, updating the database with route segment information including operator behavior, level of particulate filter regeneration achieved, engine operating conditions over the completed drive cycle, date and time of travel information, and traffic information over the drive cycle.

* * * * *